US011932037B2

(12) United States Patent
Choi et al.

(10) Patent No.: US 11,932,037 B2
(45) Date of Patent: Mar. 19, 2024

(54) APPARATUS FOR FORMING PRINTING LAYER, COVER GLASS, AND METHOD OF FABRICATING THE COVER GLASS

(71) Applicant: Samsung Display Co., Ltd., Yongin-si (KR)

(72) Inventors: Beom Gyu Choi, Seoul (KR); Byoung Yul Shim, Hwaseong-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 447 days.

(21) Appl. No.: 16/935,054

(22) Filed: Jul. 21, 2020

(65) Prior Publication Data

US 2021/0138815 A1 May 13, 2021

(30) Foreign Application Priority Data

Nov. 12, 2019 (KR) ........................ 10-2019-0144051

(51) Int. Cl.
*B41M 1/34* (2006.01)
*B41F 17/00* (2006.01)
*B41F 35/00* (2006.01)

(52) U.S. Cl.
CPC ............. *B41M 1/34* (2013.01); *B41F 17/001* (2013.01); *B41F 35/00* (2013.01)

(58) Field of Classification Search
CPC .......... B41M 1/34; B41F 17/001; B41F 35/00
See application file for complete search history.

(56) References Cited

U.S. PATENT DOCUMENTS

| | | | | |
|---|---|---|---|---|
| 4,980,221 A * | 12/1990 | Kobayashi | B41F 19/06 | 428/207 |
| 2011/0315035 A1* | 12/2011 | Muraoka | B41M 1/10 | 101/483 |
| 2015/0125662 A1* | 5/2015 | Kim | B41M 1/00 | 427/256 |
| 2018/0333948 A1* | 11/2018 | Matsuda | B41F 15/0895 | |

FOREIGN PATENT DOCUMENTS

| | | |
|---|---|---|
| JP | 2016-150494 | 8/2016 |
| KR | 10-2012-0037641 | 4/2012 |
| KR | 10-2013-0026238 | 3/2013 |
| KR | 10-2014-0091965 | 7/2014 |

* cited by examiner

*Primary Examiner* — Jennifer Bahls
*Assistant Examiner* — Quang X Nguyen
(74) *Attorney, Agent, or Firm* — H.C. Park & Associates, PLC

(57) ABSTRACT

A printed layer forming apparatus for a cover glass of a display device includes: a printing member including a first main body and a projection extending from one surface of the first main body, the projection having a thickness less than that of the first main body; and a cleaning member including a second main body, a first sidewall, and a second sidewall spaced apart from and opposing the first sidewall defining a space into which the projection is insertable to remove ink.

6 Claims, 26 Drawing Sheets

APPARATUS FOR FORMING PRINTING LAYER, COVER GLASS, AND METHOD OF FABRICATING THE COVER GLASS

CROSS REFERENCE TO RELATED APPLICATION

This application claims priority from and the benefit of Korean Patent Application No. 10-2019-0144051, filed on Nov. 12, 2019, which is hereby incorporated by reference for all purposes as if fully set forth herein.

BACKGROUND

Field

Exemplary implementations of the invention relate generally to a printing layer forming apparatus, a cover glass for a display device, and, more specifically, to a method of fabricating the cover glass using the printing layer forming apparatus.

Discussion of the Background

As multimedia is developed, display devices have been used in various fields. Thus, various kinds of display devices such as organic light emitting displays (OLEDs) and liquid crystal displays (LCDs) are being developed. Further, such display devices are applied to a variety of mobile electronic devices, for example, portable electronic devices such as smart phones, smart watches, and tablet portable computers (tablet PCs).

For example, in various display devices used in mobile devices, a transparent cover glass is disposed in front of the display panel. The display panel is divided into a display area for displaying an actual image and a non-display area, and the cover glass may be divided into a transparent area corresponding to the display area of the display panel and an opaque light blocking area corresponding to the non-display area of the display panel. Further, a light blocking member is provided and ink is printed in the opaque light blocking area of the cover glass to partially block light emitted from the display panel.

Further, display devices having a bent or rounded display surface are becoming is more popular. For example, a display panel may include a front cover glass that is partially rounded or bent is to improve aesthetics of the display device and a gripping sensation.

The above information disclosed in this Background section is only for understanding of the background of the inventive concepts, and, therefore, it may contain information that does not constitute prior art.

SUMMARY

Applicant discovered during the fabricating process of a display device having bent or rounded cover glass, the printing layer may not be uniformly formed at the edge of the glass.

Printing layer forming apparatus for a cover glass of display devices constructed according to the principles and exemplary implementations of the invention and exemplary methods of fabricating a cover glass using the printing layer forming apparatus according to the principles of the invention provide for uniform and precise printing on bent or rounded cover glass. For example, the printing layer forming apparatus is capable of forming a printing layer on one surface of a printing member having opposed, substantially flat surfaces and a curved surface connecting the flat surfaces. One of the flat surfaces is inserted into an opening, such as a groove, of a cleaning member to remove the ink from all portions of the flat surface except for one or more edges. The printing member can then be used to transfer the ink to corresponding edges on the cover glass Additional features of the inventive concepts will be set forth in the description which follows, and in part will be apparent from the description, or is learned by practice of the inventive concepts.

According to one aspect of the invention, a printed layer forming apparatus for a cover glass of a display device comprises: a printing member including a first main body and a projection extending from one surface of the first main body, the projection having a thickness less than that of the first main body; and a cleaning member including a second main body, a first sidewall, and a second sidewall spaced apart from and opposing the first sidewall defining a space into which the projection is insertable to remove ink.

The space may be a groove having an inner side to receive an outer surface of the projection.

The groove may have a width greater than the thickness of the projection.

When the projection is inserted into the groove of the cleaning member, the outer surface of the projection may be spaced from the inner side of the groove.

The outer surface of the projection may have first and second portions with the first portion being surrounded by the groove and the second portion being disposed outside the groove when the projection is inserted in the groove.

When the projection may be pressed into the groove, at least one portion of the outer surface of the projection may be deformable to contact the inner side of the groove.

An area of the outer surface of the projection may be greater than an area of the inner side of the groove.

A protruding end portion of the projection may have a rounded shape.

The printing member may be a printing pad, the projection comprises a spacer, the cleaning member comprises a cleaner, the space comprises a groove and: the spacer has a first length in the one direction; and a first inner side of the grove formed by the first sidewall has a second length in the one direction, wherein the second length may less than the first length.

A second inner side of the space formed by the second sidewall may have a third length in the one direction, wherein the third length may be less than the second length.

A second inner side of the groove formed by the second sidewall may have a fourth length in the one direction, wherein the second length may be equal to the fourth length.

According to another aspect of the invention, a method of fabricating a cover glass for a display device includes: transferring ink to a printing member having a first main body and a projection extending from one surface of the first main body in one direction; inserting the printing member into a first space in a cleaning member and removing at least a portion of the ink transferred to the printing member and contacting the printing member with a base member of the cover glass and forming a printing layer on one surface of the base member.

The step of transferring the ink to the printing member may include transferring the ink only to an outer surface of the projection.

The step of removing the at least a portion of the ink may include pressing the printing member into the space such that a center portion of the outer surface of the projection contacts an inner side of the space to remove the ink only from on the center portion of the outer surface of the spacer, thereby leaving the ink that was transferred to an edge portion of the outer surface of the projection in place.

The base member may include: a first substantially flat portion; a second substantially flat portion spaced apart from the first substantially flat portion; and a bending portion connecting the first substantially flat portion and the second substantially flat portion, the bending portion being bent in one direction.

The step of forming the printing layer may include inserting the projection in a second space defined by the first substantially flat portion and the second substantially flat portion such that the projection contacts one surface of the base member, and the ink remaining on the projection may be printed on the one surface of the base member.

The printing layer may be formed at an edge of the one surface of the base member that faces a third space surrounded by the first substantially flat portion, the second substantially flat portion, and the bending portion.

The projection may have a thickness smaller than that of the first main body, and the first space may have a width greater than the thickness of the projection.

When the projection is inserted into the first space, an outer surface of the projection may be spaced from an inner side of the first space.

According to another aspect of the invention, a cover glass for a display device has a display area and a light blocking area at least partially surrounding the display area. The cover glass includes: a base member including a first substantially flat portion, a second substantially flat portion spaced from the first substantially flat portion, and a bending portion connecting the first substantially flat portion and the second substantially flat portion; and a printing layer disposed in the light blocking area on an edge of one surface of the base member that faces a space defined by the first substantially flat portion, the second substantially flat portion, and the bending portion.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the inventive concepts.

DETAILED DESCRIPTION

Figure 1:
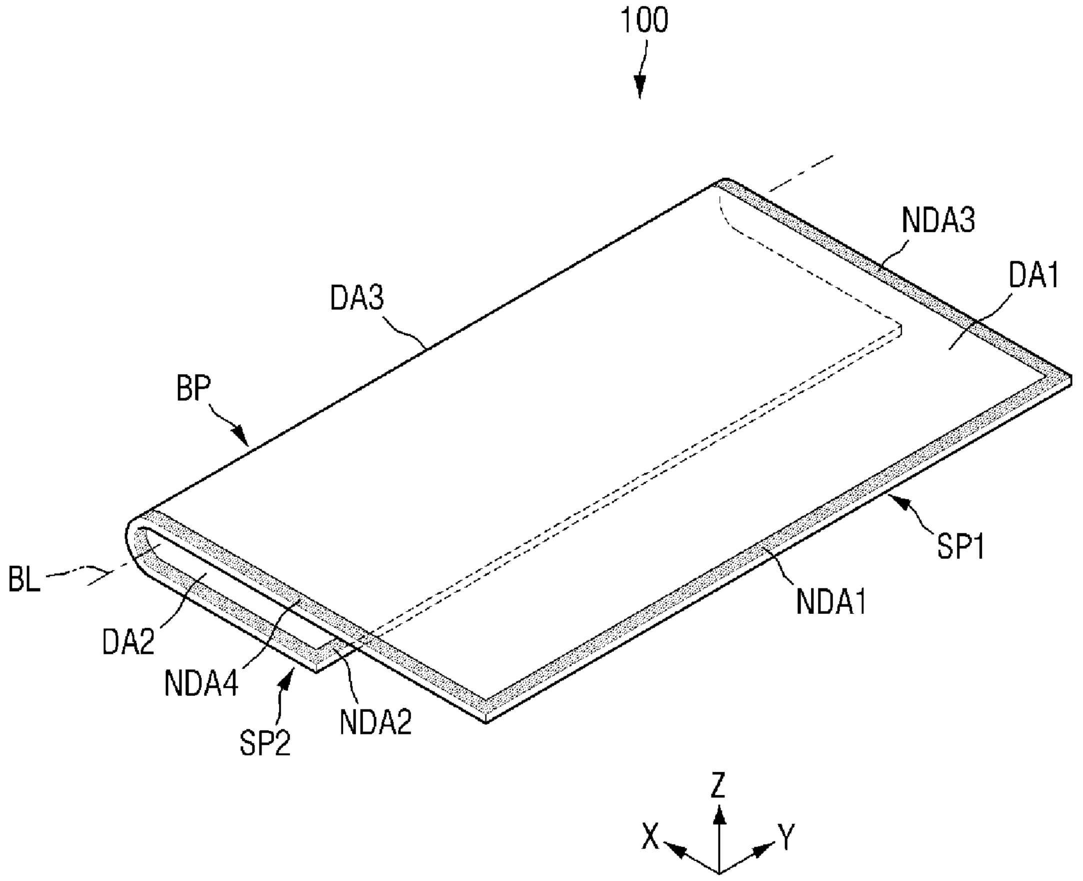
FIG. 1 is a perspective view of an exemplary embodiment of a cover glass constructed according to the principles of the invention.

In the following description, for the purposes of explanation, numerous specific details are set forth in order to provide a thorough understanding of various exemplary embodiments or implementations of the invention. As used herein "embodiments" and "implementations" are interchangeable words that are non-limiting examples of devices or methods employing one or more of the inventive concepts disclosed herein. It is apparent, however, that various exemplary embodiments is practiced without these specific details or with one or more equivalent arrangements. In other instances, well-known structures and devices are shown in block diagram form in order to avoid unnecessarily obscuring various exemplary embodiments. Further, various exemplary embodiments is different, but do not have to be exclusive. For example, specific shapes, configurations, and characteristics of an exemplary embodiment is used or implemented in another exemplary embodiment without departing from the inventive concepts.

Unless otherwise specified, the illustrated exemplary embodiments are to be understood as providing exemplary features of varying detail of some ways in which the inventive concepts is implemented in practice. Therefore, unless otherwise specified, the features, components, modules, layers, films, panels, regions, and/or aspects, etc. (hereinafter individually or collectively referred to as "elements"), of the various embodiments is otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements is exaggerated for clarity and/or descriptive purposes. When an exemplary embodiment is implemented differently, a specific process order is performed differently from the described order. For example, two consecutively described processes is performed substantially at the same time or performed in an order opposite to the described order. Also, like reference numerals denote like elements.

When an element, such as a layer, is referred to as being "on," "connected to," or "coupled to" another element or layer, it is directly on, connected to, or coupled to the other element or layer or intervening elements or layers is present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z-axes, and is interpreted in a broader sense. For example, the D1-axis, the D2-axis, and the D3-axis is perpendicular to one another, or may represent different directions that are not perpendicular to one another. For the purposes of this disclosure, "at least one of X, Y, and Z" and "at least one selected from the group consisting of X, Y, and Z" is construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. is used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, is used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus is otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various exemplary embodiments are described herein with reference to sectional and/or exploded illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not necessarily be construed as limited to the particular illustrated shapes of regions, but are to include deviations in shapes that result from, for instance, manufacturing. In this manner, regions illustrated in the drawings is schematic in nature and the shapes of these regions may not reflect actual shapes of regions of a device and, as such, are not necessarily intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

Figure 2:
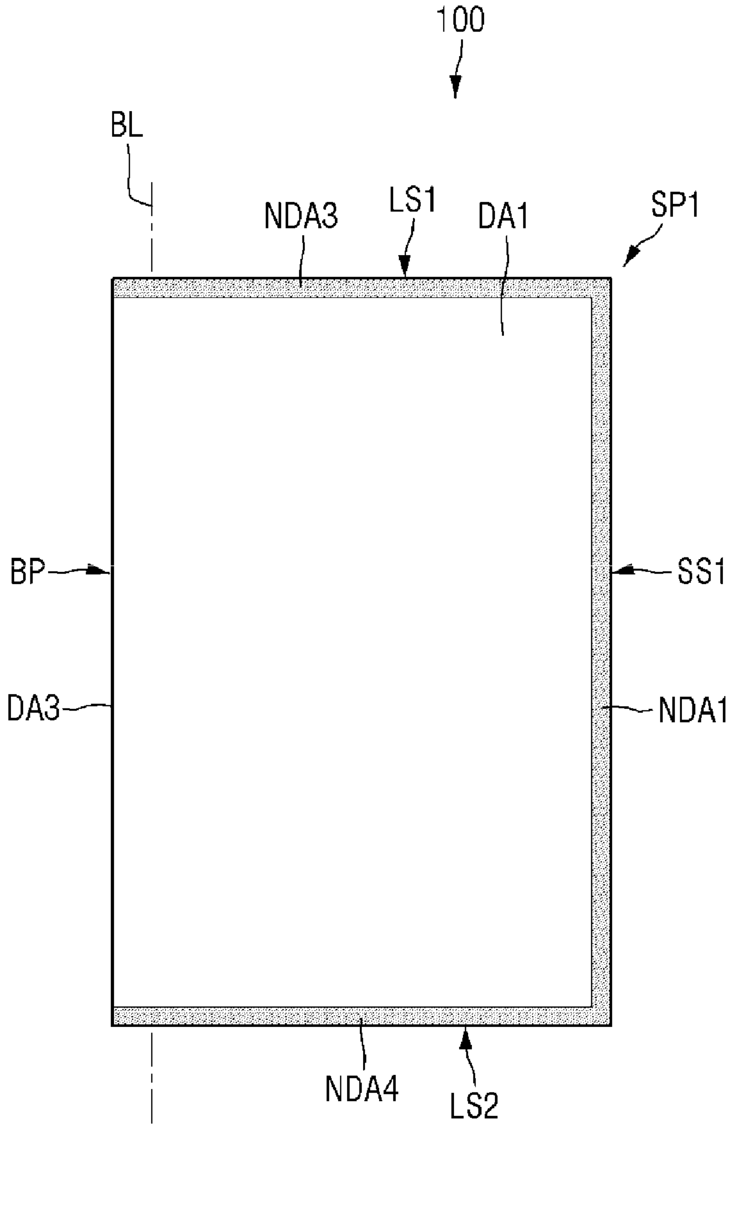
FIG. 2 is a plan view of the cover glass of FIG. 1.
Figure 3:
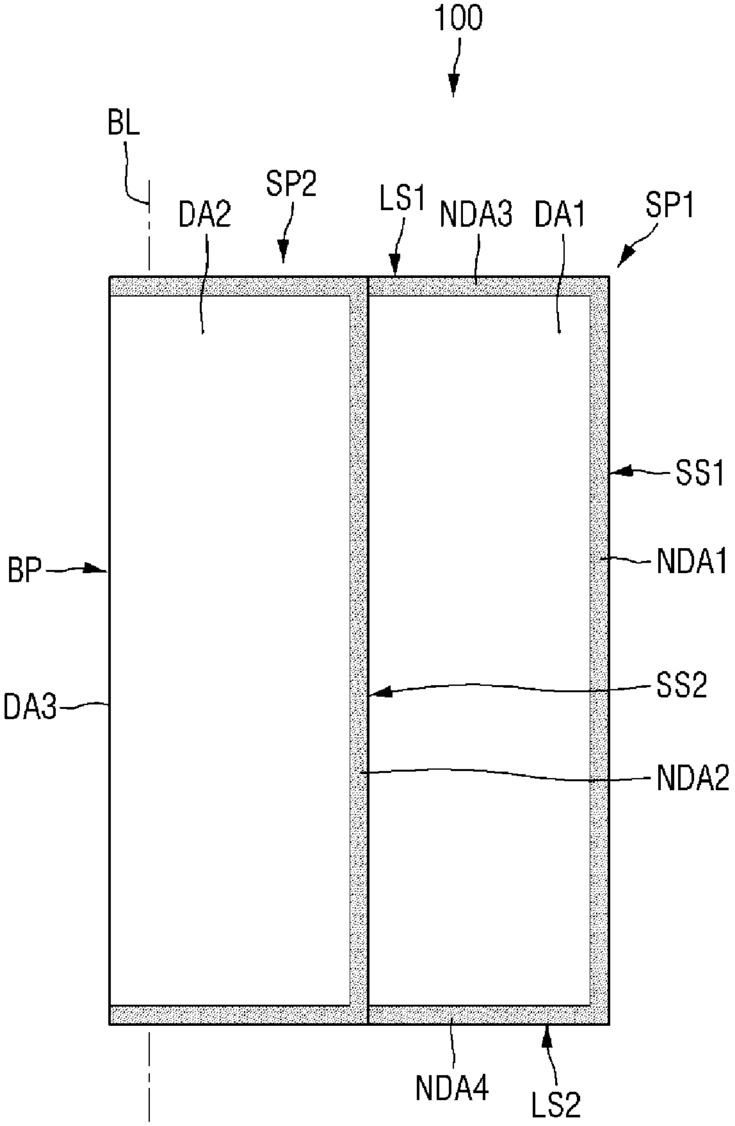
FIG. 3 is a rear view of the cover glass of FIG. 1.

FIG. 1 is a perspective view of an exemplary embodiment of a cover glass constructed according to the principles of the invention. FIG. 2 is a plan view of the cover glass of FIG. 1. FIG. 3 is a rear view of the cover glass of FIG. 1.

FIG. 2 is a plan view of a cover glass 100 of FIG. 1 when the cover glass 100 is viewed from above, e.g., in a third direction (Z-axis direction), and FIG. 3 is a rear view of the cover glass 100 of FIG. 1 when the cover glass 100 is viewed from below, e.g., in an opposite direction of the third direction (Z-axis direction).

As used herein, the terms "upper portion," "top," and "upper surface" denote an upward direction, e.g., a Z-axis direction, and the terms "lower portion," "bottom," and "lower surface" denote an opposite direction of the Z-axis direction. In addition, the terms "left," "right," "upper," and "lower" denote directions when the cover glass 100 is viewed from above. For example, the terms "left," "right," "upper," and "lower" respectively denote an opposite direction of an X-axis direction, the X-axis direction, a Y-axis direction, and an opposite direction of the Y-axis direction.

Referring to FIGS. 1 to 3, the cover glass 100 may have a generally rectangular shape when viewed from above and may have a form in which one part thereof is bent downward to face the other part. The cover glass 100 according to an exemplary embodiment may include a first substantially flat portion SP1, a second substantially flat portion SP2, and a bending portion BP which is bent and connects the first flat portion SP1 and the second flat portion SP2. Since the cover glass 100 includes the bending portion BP, the first flat portion SP1 and the second flat portion SP2 is spaced apart from and face each other, and the cover glass 100 may have a form substantially surrounding the space by which the first flat portion SP1 and the second flat portion SP2 are spaced apart from each other (opposed).

The cover glass 100 may include sides extending in a first direction (X-axis direction) and a second direction (Y-axis direction). The sides extending in the first direction (X-axis direction) is bent downward. For example, the sides, which extend in the second direction of the cover glass 100, may form the flat portions SP1 and SP2, and the sides, which extend in the first direction of the cover glass 100 and are bent downward, may form the bending portion BP of the cover glass 100. For example, the cover glass 100 may include a first longitudinal side LS1 and a second longitudinal side LS2 which extend in the first direction (X-axis direction) and a first short side SS1 and a second short side SS2 which extend in the second direction (Y-axis direction). The first longitudinal side LS1 and the second longitudinal side LS2 of the cover glass 100 is bent downward along a bending line BL such that any one of the sides extending in the second direction (Y-axis direction), for example, the second short side SS2, is positioned under one surface of the cover glass 100.

More specifically, the first flat portion SP1 and the second flat portion SP2 may form substantially flat surfaces of the cover glass 100. The first flat portion SP1 may include the first short side SS1 extending in the second direction (Y-axis direction), and the second flat portion SP2 may include the second short side SS2 extending in the second direction (Y-axis direction). The first longitudinal side LS1 and the second longitudinal side LS2 extending in the first direction (X-axis direction) is bent downward along the bending line BL and positioned between the first flat portion SP1 and the second flat portion SP2.

For example, the first flat portion SP1 and the second flat portion SP2 may have substantially rectangular shapes when viewed from above and is oppose each other. Further, the first flat portion SP1 and the second flat portion SP2 may have various other shapes, e.g., polygon shapes or curved shapes, when viewed from above. The first flat portion SP1 may include one surface facing upward (e.g., Z-axis direction) and the other surface facing downward, and the second flat portion SP2 may include one surface facing downward and the other surface facing upward. The other surface of the first flat portion SP1 may face the other surface of the second flat portion SP2. For example, since lengths of portions, which correspond to the second flat portion SP2, of the longitudinal sides LS1 and LS2 are less than lengths of portions, which correspond to the first flat portion SP1, the second flat portion SP2 faces a partial portion of the first flat portion SP1. For example, the cover glass 100 may include the first flat portion SP1 and the second flat portion SP2 which are asymmetrically formed. Alternatively, the longitudinal sides LS1 and LS2 of the first flat portion SP1 and the second flat portion SP2 may be formed to have substantially the same length, and the first flat portion SP1 may face substantially the entire the second flat portion SP2.

In more detail, corners, at which the longitudinal sides LS1 and LS2 meet the short sides SS1 and SS2 in the first flat portion SP1 and the second flat portion SP2, are formed at right angles. In another exemplary embodiment, corners, at which longitudinal sides LS1 and LS2 meet short sides SS1 and SS2, is formed to have rounded forms having predetermined curvatures in the cover glass 100. Alternatively, the cover glass 100 is formed to have various other shapes such as polygonal shapes, circular shapes, or oval shapes when viewed above.

The bending portion BP is a portion at which a flat surface of the cover glass 100 is bent in the third direction (Z-axis direction) from the bending line BL. For example, the bending portion BP may connect the first flat portion SP1 and the second flat portion SP2 and have a curved surface, and the first flat portion SP1 or the second flat portion SP2 may have a flat surface. The cover glass 100 may have a form in which the flat portions SP1 and SP2 and the bending portion BP surrounds a space by which the flat portions SP1 and SP2 oppose each other.

Figure 4:
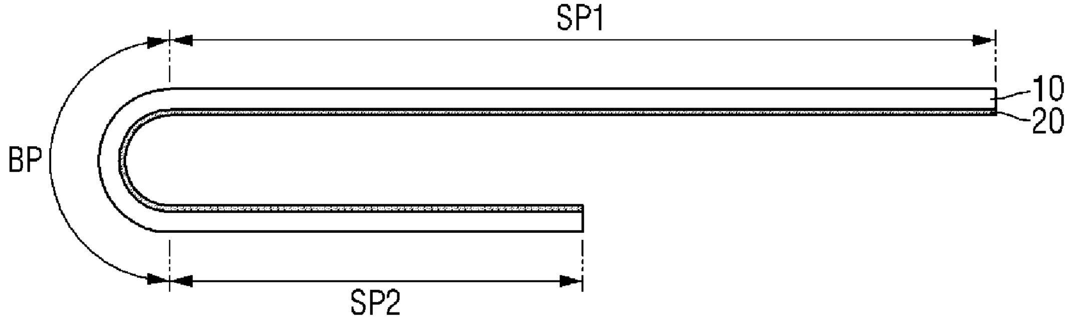
FIGS. 4 and 5 are cross-sectional views of the cover glass of FIG. 1.

In more detail, the cover glass 100 may include transparent areas DA and light blocking areas NDA formed outside the transparent areas DA. The transparent areas DA is areas through which light incident from outside or inside the cover glass 100 transmits or on which images are displayed. The light blocking areas NDA is areas by which transmission of the light is absorbed or blocked. For example, the light blocking areas NDA is formed on areas in which printing layers 20 of the cover glass 100, which will be described below referring to FIG. 4, are disposed.

For example, the transparent areas DA is positioned in a central portion of the cover glass 100, and the light blocking areas NDA is positioned in an edge of the cover glass 100 to surround the transparent areas DA. The transparent areas DA may include a first transparent area DA1 in the first flat portion SP1, a second transparent area DA2 in the second flat portion SP2, and a third transparent area DA3 in the bending portion BP. The transparent areas DA is positioned in areas excluding the light blocking areas NDA at the edge of the cover glass 100, the first transparent area DA1 and the second transparent area DA2 in the flat portions SP1 and SP2 may have substantially flat surfaces, and the third transparent area DA3 in the bending portion BP is bent to have a curved surface. According to an exemplary embodiment, the transparent areas DA in the cover glass 100 are formed in the flat portions SP1 and SP2 and the bending portion BP. Light may pass through the flat surfaces of the flat portions SP1 and SP2 and the curved surface of the bending portion BP.

The light blocking areas NDA may include a first light blocking area NDA1 positioned along the first short side SS1, a second light blocking area NDA2 positioned along the second short side SS2, a third light blocking area NDA3 positioned along the first longitudinal side LS1, and a fourth light blocking area NDA4 positioned along the second longitudinal side LS2. The light blocking areas NDA are positioned along the first and second longitudinal sides LS1 and LS2 and the first and second short sides SS1 and SS2 of the cover glass 100, and the transparent areas DA may be spaced apart from the first and second longitudinal sides LS1 and LS2 and the first and second short sides SS1 and SS2 and be positioned in central portions of the first and second flat portions SP1 and SP2 and the bending portion BP. The light blocking areas NDA formed along the first and second longitudinal sides LS1 and LS2 and the first and second short sides SS1 and SS2 may have different lengths than lengths of the first and second longitudinal sides LS1 and LS2 and the first and second short sides SS1 and SS2. Further, the third light blocking area NDA3 and the fourth light blocking area NDA4 positioned along the first and second longitudinal sides LS1 and LS2 may include areas partially bent in the bending portion BP.

The first flat portion SP1, the second flat portion SP2, and the bending portion BP of the cover glass 100 may include the transparent areas DA and the light blocking areas NDA, and light emitted from inside the cover glass 100 may be displayed on the first flat portion SP1, the second flat portion SP2, and the bending portion BP. As will be described below, the cover glass 100 may include a base member 10 (shown in FIG. 4) formed of a transparent material and the printing layers 20 (shown in FIG. 4) disposed on one surface of the base member 10. The light blocking areas NDA are formed in the areas in which the printing layers 20 are disposed, and the transparent areas DA are formed in other areas.

Figure 5:
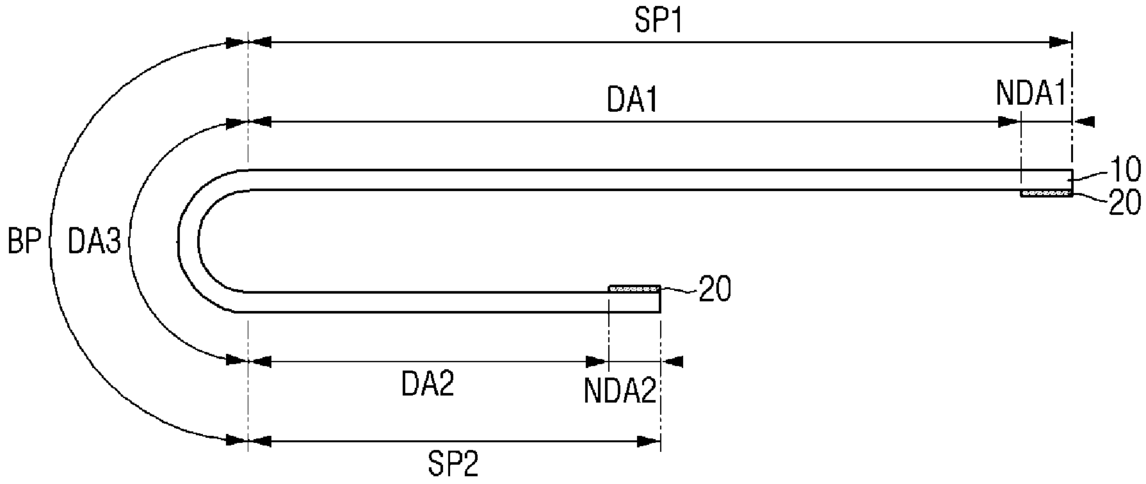

Hereinafter, the structure of the cover glass 100 will be described in more detail with reference to other drawings. FIGS. 4 and 5 are cross-sectional views of exemplary embodiments of the cover glass of FIG. 1.

FIG. 4 is a plan view of the cover glass 100 of FIG. 1 when viewed from a side, e.g., in the second direction (Y-axis direction), FIG. 5 is a cross-sectional view of a central portion of the cover glass 100 of FIG. 1 showing cross-sections of the first light blocking area NDA1, the first transparent area DA1, the third transparent area DA3, the second transparent area DA2, and the second light blocking area NDA2, which are cut in the first direction (X-axis direction).

Referring to FIGS. 4 and 5 with FIGS. 1 to 3, the cover glass 100 may include the base member 10 and the printing layers 20 disposed on at least a portion of the base member 10. The base member 10 may be a base frame of the cover glass 100. For example, the base member 10 may be formed of a transparent material, e.g., glass or plastic. For example, the base member 10 of the cover glass 100 is formed of plastic, and the cover glass 100 may have a flexible property. The base member 10 may be formed of, e.g., polyimide, polyacrylate, polymethylmethacrylate (PMMA), polycarbonate (PC), polyethylenenaphthalate (PEN), polyvinylidene chloride, polyvinylidene difluoride (PVDF), polystyrene, ethylene vinylalcohol copolymer, polyethersulphone (PES), polyetherimide (PEI), polyphenylene sulfide (PPS), polyallylate, tri-acetyl cellulose (TAC), cellulose acetate propionate (CAP), and the like but are not limited thereto.

For example, the base member 10 may further include coating layers disposed on upper and lower surfaces of the plastic. In an exemplary embodiment, a coating layer may be an organic layer including an acrylate compound and the like and/or a hard coating layer including an organic and inorganic multilayer. The organic and inorganic multilayer may be a layer in which an inorganic material, e.g., silicon oxide, zirconium oxide, aluminum oxide, tantalum oxide, niobium oxide, or glass beads is distributed in an organic material, e.g., the acrylate compound. In another exemplary embodiment, a coating layer may include a metal oxide layer. The metal oxide layer may include, e.g., a metal oxide containing titanium, aluminum, molybdenum, tantalum, copper, indium, tin, tungsten, or the like, but is not limited thereto.

The base member 10 may have substantially the same shape as the cover glass 100, and the base member 10 and members disposed on the base member 10 may form the cover glass 100. For example, the base member 10 may be formed in a substantially rectangular shape when viewed from above and may include the flat portions SP1 and SP2 opposing each other and a bending portion BP which connects the flat portions SP1 and SP2 and has a bent form. The base member 10 may have a form in which the flat portions SP1 and SP2 and bending portion BP surround a space by which the flat portions SP1 and SP2 are spaced apart from each other. For example, the base member 10 is formed in a similar manner to the cover glass 100 described with reference to FIGS. 1 to 3.

The printing layers 20 may be disposed on one surface of the base member 10 in the third direction (Z-axis direction). For example, the one surface of the base member 10 may face the space surrounded by the base member 10. Since the printing layers 20 include a material which absorbs light emitted toward the base member 10 or blocks transmission of the light, the printing layers 20 may block the light incident toward the printing layers 20. For example, the printing layers 20 may be formed in a single layer. In some exemplary embodiments, printing layers 20 may have a structure in which a plurality of layers having different widths are stacked. For example, differences in width between the printing layers 20 having the different widths may range from 15 μm to 20 μm. Further, thicknesses of the printing layers 20 may range from 3 μm to 7 μm.

In an exemplary embodiment, the printing layers 20 may be disposed along an edge of the base member 10, and the light blocking areas NDA of the cover glass 100 may be formed in the areas in which the printing layers 20 are disposed on the base member. The printing layers 20 of FIG. 4 may form the fourth light blocking area NDA4 positioned along the second longitudinal side LS2 of the cover glass 100, and the printing layers 20 of FIG. 5 may form the first light blocking area NDA1 and the second light blocking area NDA2 positioned along the short sides SS1 and SS2 of the cover glass 100. The transparent areas DA may be formed in the areas in which the printing layers 20 are not disposed in the flat portions SP1 and SP2 and the bending portion BP.

For example, the light blocking areas NDA in the cover glass 100 may be defined according to arrangement of the printing layers 20 on the base member 10, and light beams emitted toward the base member 10 may be displayed in the transparent areas DA. For example, the arrangement of the printing layers 20 may be similar to the light blocking areas NDA of the cover glass 100 given with reference to FIGS. 1 to 3.

For example, the printing layers 20 is formed by a method of transferring or printing ink INK (shown in FIG. 14) that forms the printing layers 20 on one surface of the base member 10. For example, the cover glass 100 may be formed by a method of forming the printing layer 20 including a pad-printing method of transferring ink including a material, which absorbs light or blocks transmission of the light, on a pad and printing the ink on one surface of the base member 10. The pad-printing method may be a method in which an ink is transferred to a target object, on which the ink is printed, through a contact between a pad and the target object. The ink transferred to the pad may be printed according to surface energy between the pad and the ink and surface energy between the target object and the ink in a contact area in which the target object contacts the pad.

For example, the ink transferred to the pad is printed on one surface of the base member 10 by a contact between the pad and the base member 10. Referring to FIGS. 1 to 5, the base member 10 or the cover glass 100 may include the opposing flat portions SP1 and SP2 and the bending portion BP which is bent and connects the flat portions SP1 and SP2 and have a form surrounding a specific space. Thus, the pad may have a form insertable into the space. The printing layers 20 of the cover glass 100 may be formed on one surface of surfaces of the base member 10, which faces the space surrounded by the base member 10. The pad for printing the ink may be inserted into the space such that the pad contacts the one surface of the base member 10.

According to an exemplary embodiment, a printing layer forming apparatus for forming the printing layers 20 of the cover glass 100 may include a printing member in the form of a print pad having a projection, such as downwardly extending spacer having a predetermined thickness and a cleaning member, which is in the form of a cleaner, to form the printing layers 20 on the opposing flat portions SP1 and SP2 of the base member 10. Hereinafter, the printing layer forming apparatus according to an exemplary embodiment will be described.

Figure 6:
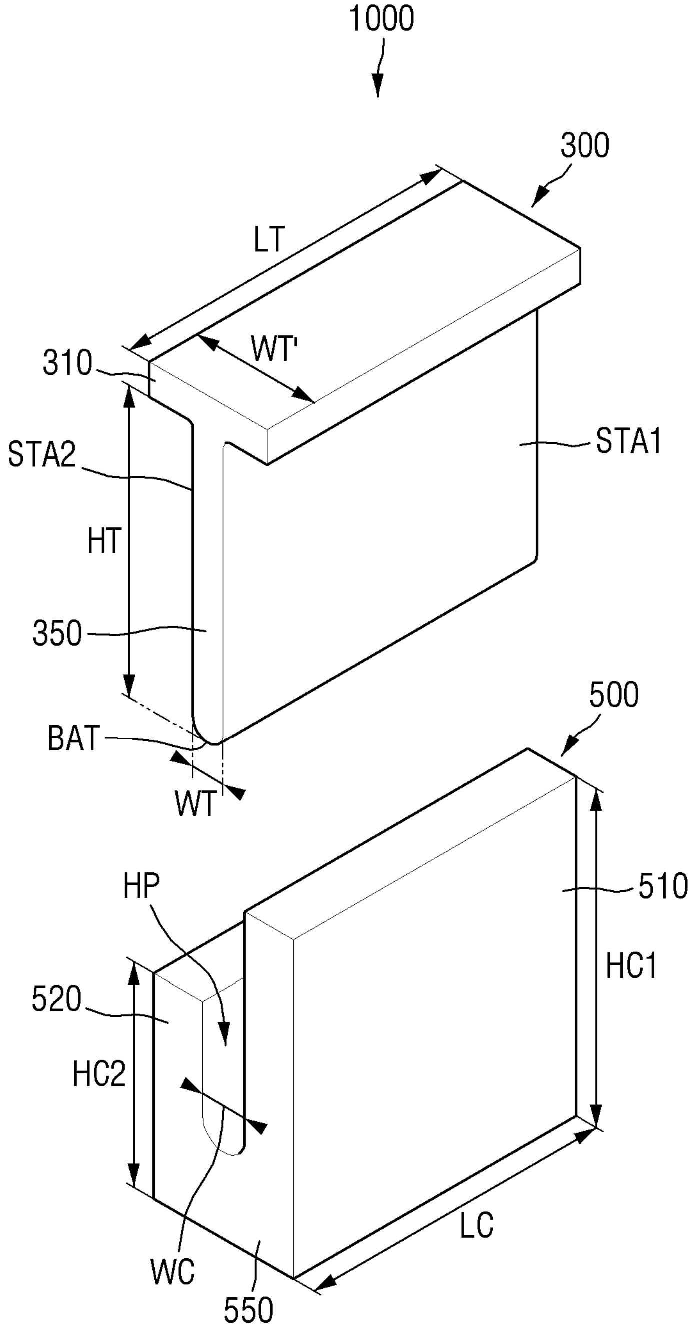
FIG. 6 is a perspective view of an exemplary embodiment of a printing layer forming apparatus constructed according to the principles of the invention.
Figure 7:
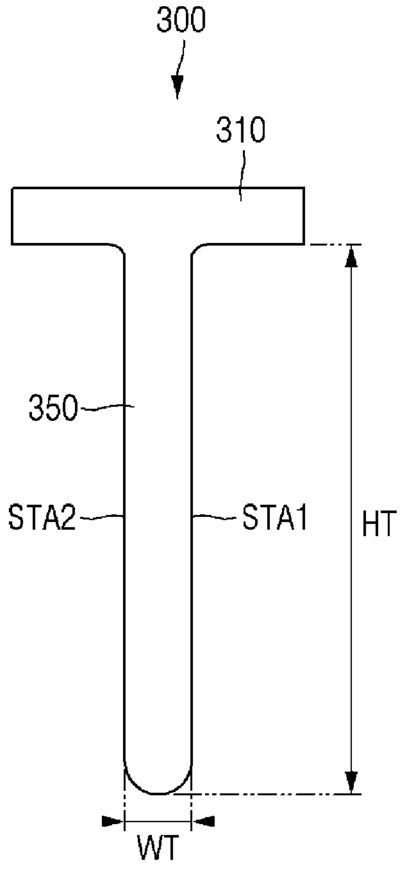
FIG. 7 is a cross-sectional view of the print pad included in the printing layer forming apparatus of FIG. 6*n*.
Figure 8:
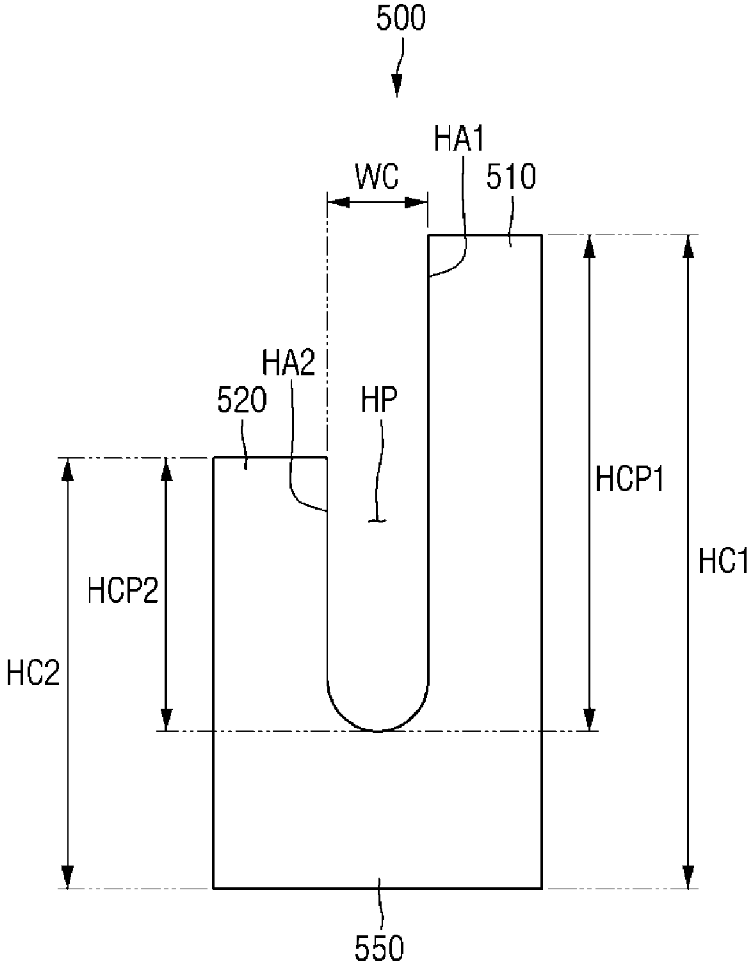
FIG. 8 is a cross-sectional view of an exemplary embodiment of a cleaner included in the printing layer forming apparatus of FIG. 6.

FIG. 6 is a perspective view of a printing layer forming apparatus constructed according to the principles of the invention. FIG. 7 is a cross-sectional view of a print pad included in the printing layer forming apparatus constructed according to the principles of the invention. FIG. 8 is a cross-sectional view of a cleaner included in the printing layer forming apparatus constructed according to the principles of the invention.

Referring to FIGS. 6 to 8, a printing layer forming apparatus 1000 may include a print pad 300 and a cleaner 500. The printing layer forming apparatus 1000 according to an exemplary embodiment may include the print pad 300 having a specific form and the cleaner 500 configured to partially remove ink transferred to the print pad 300. The print pad 300 may have a form corresponding to the form of a target object on which the ink is printed. The cleaner 500 may selectively remove the ink transferred to the print pad 300 to form an area of the printed pad 300, which corresponds to an area of the target object in which the ink is not printed. According to an exemplary embodiment, the printing layers 20 of the cover glass 100 of FIG. 1 may be formed by using the printing layer forming apparatus 1000.

The print pad 300 may include a first main body 310 and a projection in the form of a spacer 350 downwardly extending first main body 310. For example, the spacer 350 may be covered by ink.

The first main body 310 is a portion on which the spacer 350 of the print pad 300 is formed. For example, the first main body 310 may be coupled to a moving member, and the print pad 300 may be moved according to movement of the moving member. The print pad 300 may repeat a reciprocating action according to the movement of the moving member coupled to the first main body 310 to transfer or print ink to a target object.

The form of the first main body 310 is not particularly limited. Referring to FIGS. 6 and 7, the first main body 310 may have a substantially rectangular shape when viewed from above, but the exemplary embodiments are not limited thereto, and the first main body 310 may have various shapes. For example, the first main body 310 may have any shape and size corresponding to the shape and size of the target object on which ink is to be printed. Further, referring to FIG. 6, a length LT of the first main body 310 which is measured in one direction (e.g., Y-axis direction) is greater than a length LC of the cleaner 500 measured in the one direction.

The spacer 350 is formed on one surface of the first main body 310. The spacer 350 is a portion of the print pad 300 on which ink is transferred and which contacts a target object. The ink transferred to the spacer 350 is printed on the target object by moving the spacer 350 into contact with the target object. For example, the spacer 350 may have a form corresponding to the form of the target object and be capable of easily contacting with the target object. As described with reference to FIG. 1, the print pad 300 may contact the base member 10 of the cover glass 100. Thus, the spacer 350 of the print pad 300 may have a specific form corresponding to the form of the base member 10 such that the spacer 350 may contact the areas of the base member 10 in which the printing layers 20 are formed.

According to an exemplary embodiment, the spacer 350 may have a thickness WT less than a thickness WT' of the first main body 310 and have a form protruding from one surface of the first main body 310. Referring to FIGS. 1 and 6, the base member 10 of the cover glass 100 may have a form surrounding a predetermined space, and the spacer 350 of the print pad 300 may have a form insertable into the space surrounded by the base member 10. For example, during a process of fabricating the cover glass 100 using the printing layer forming apparatus 1000, as described below, the spacer 350 is inserted into the space surrounded by the base member 10, and may contact one surface of the base member 10 to form the printing layers 20.

For example, the spacer 350 may have the thickness WT smaller than the thickness WT' of the first main body 310 and may extend in Z-axis direction to have a first length HT. The thicknesses WT of the spacer 350 and the thickness WT' of the first main body 310 WT' is measured in X-axis direction. Further, the spacer 350 may have a width equal to the length LT of the first main body 310 measured in Y-axis direction. For example, the width, the thickness WT, and the length HT of the spacer 350 is modified according to the form of a target object on which ink is printed. The spacer 350 is inserted into a groove HP of the cleaner 500. For example, when the ink is transferred to the target object, the spacer 350 is inserted into a specific space or region of the target object to contact the target object.

For example, when the ink is transferred to the print pad 300, the ink is transferred to only an outer surface of the spacer 350. For example, the ink may cover the outer surface of the spacer 350, and may not cover the first main body 310. The spacer 350 may include a first surface STA1, a second surface STA2, and a protruding end portion. The first surface STA1 and the second surface STA2 may have flat surfaces, and the protruding end portion may have a rounded shape. The spacer 350 of the print pad 300 may have a form corresponding to the shape of the base member 10 of the cover glass 100 of FIG. 1. According to an exemplary embodiment, the spacer 350 may include the first surface STA1 and the second surface STA2 corresponding to the flat portions ST1 and ST2 of the base member 10 and the end portion having a rounded form corresponding to the bending portion BP of the base member 10. For example, when the spacer 350 contacts the base member 10, the first surface STA1 and the second surface STA2 of the spacer 350 may contact the flat portions ST1 and ST2 of the base member 10, and the rounded form of the spacer 350 may contact the bending portion BP of the base member 10.

In a process of fabricating the cover glass 100, ink is transferred to the first surface STA1, the second surface STA2, and the round end portion of the spacer 350 of the print pad 300. Further, when the spacer 350 having the ink contacts the base member 10, some of the ink is printed on the base member 10 to form the printing layers 20.

In this case, the print pad 300 is formed of an elastic or soft material so that a form of the print pad 300 thereof is changed due to an external force when the print pad 300 contacts the target object. For example, the print pad 300 is formed of a material e.g., silicone, gelatin, latex, synthetic rubber, or elastic polyurethane. However, exemplary embodiments of the print pad 300 are not limited thereto.

For example, the print pad 300 is pressed to contact the target object by the external force, and at least one portion of the print pad 300 is changed to form the printing layer 20 on the target object.

The printing layers 20 on the base member 10 is disposed on only an edge of one surface of the base member 10. For example, before the spacer 350 contacts the base member 10, ink transferred to the spacer 350 may remain only in portions of the spacer 350 corresponding to the areas of the base member 10 in which the printing layers 20 are disposed, and is removed from the other portions of the spacer 350*is*. According to an exemplary embodiment, the printing layer forming apparatus 1000 may include the cleaner 500 that is capable of selectively removing some portion of the ink transferred to the spacer 350.

The cleaner 500 may include the groove HP into which the spacer 350 of the print pad 300 is insertable. Further, the cleaner 500 may include a second main body 550, and a first sidewall 510, and a second sidewall 520, which are connected to the second main body 550. The first sidewall 510 and the second sidewall 520 are spaced apart from and oppose each other to form the groove HP in which the spacer 350 is insertable. The groove HP is defined by the second main body 550, the first sidewall 510, and the second sidewall 520. For example, the cleaner 500 is formed as an integrated member, and the second main body 550, the first sidewall 510, and the second sidewall 520 is parts of the integrated member. In an exemplary embodiment, the second main body 550, the first sidewall 510, and the second sidewall 520 is formed of the substantially same material and formed in the same process.

The groove HP may accommodate the spacer 350 of the print pad 300 when the spacer 350 is inserted therein. Further, the grove HP is formed in the cleaner 500 and include inner sides HA1 and HA2 having forms corresponding to the outer surface of the spacer 350. For example, the groove HP may include the first inner side HA1 and the second inner side HA2 corresponding to the first surface STA1 and the second surface STA2 of the spacer 350 and a round portion corresponding to the end portion of the spacer 350. The first inner side HA1 and the second inner side HA2 may have substantially flat surfaces. The groove HP may have a width WC greater than the thickness WT of the spacer 350 so that the spacer 350 having the predetermined thickness WT is inserted into the groove HP.

When ink is transferred to the spacer 350, the spacer 350 is inserted into the groove HP of the cleaner 500. Further, when pressure is applied to the spacer 350 in the groove HP, the thickness WT of the spacer 350 increases to contact the groove HP of the cleaner 500. When the spacer 350 contacts the cleaner 500, some ink transferred to the spacer 350 is removed by the cleaner 500. Accordingly, only ink to be printed to a target object may remain on the outer surface of the spacer 350 of the print pad 300.

According to an exemplary embodiment, the printing layer forming apparatus 1000 may have a specific form like the spacer 350 of the print pad 300 to form the printing layers 20 of the cover glass 100 illustrated in FIG. 1. Similarly, even the cleaner 500 may have a specific form so that ink corresponding to the printing layers 20 of the cover glass 100 remains on the spacer 350. In the cover glass 100 of FIG. 1, the first flat portion SP1 and the second flat portion SP2 may have different areas, and ink is transferred to specific positions of the spacer 350, which correspond to the printing layers 20 on the first flat portion SP1 and the second flat portion SP2.

According to an exemplary embodiment, referring to FIGS. 6 and 8, the first sidewall 510 and the second sidewall 520 of the cleaner 500 may have different lengths HC1 and HC2. Further, the first inner side HA1 and the second inner side HA2 of the groove HP may have different depths HCP1 and HCP2. For example, when ink is transferred to the entire outer surface of the spacer 350, some ink is removed by the cleaner 500 such that ink to be printed on the target object may remain on the spacer 350. The first sidewall 510 and the second sidewall 520 of the cleaner 500 may have the different lengths HC1 and HC2, and the first inner side HA1 and the second inner side HA2 of the groove HP of the cleaner 500 may have the different lengths HCP1 and HPC2. The first inner side HA1 and the second inner side HA2 of the groove HP may correspond to the first and second transparent areas DA1 and DA2 of the flat portions SP1 and SP2 of the cover glass 100.

The groove HP may have a form corresponding to the transparent areas DA of the cover glass 100, and be formed in the cleaner 500. When the spacer 350 of the print pad 300 is inserted into the groove HP of the cleaner 500, ink in portions corresponding to the transparent areas DA of the cover glass 100 is selectively removed by the cleaner 500. Ink is transferred only to positions of the spacer 350 corresponding to the light blocking areas NDA of the cover glass 100.

Figure 9:
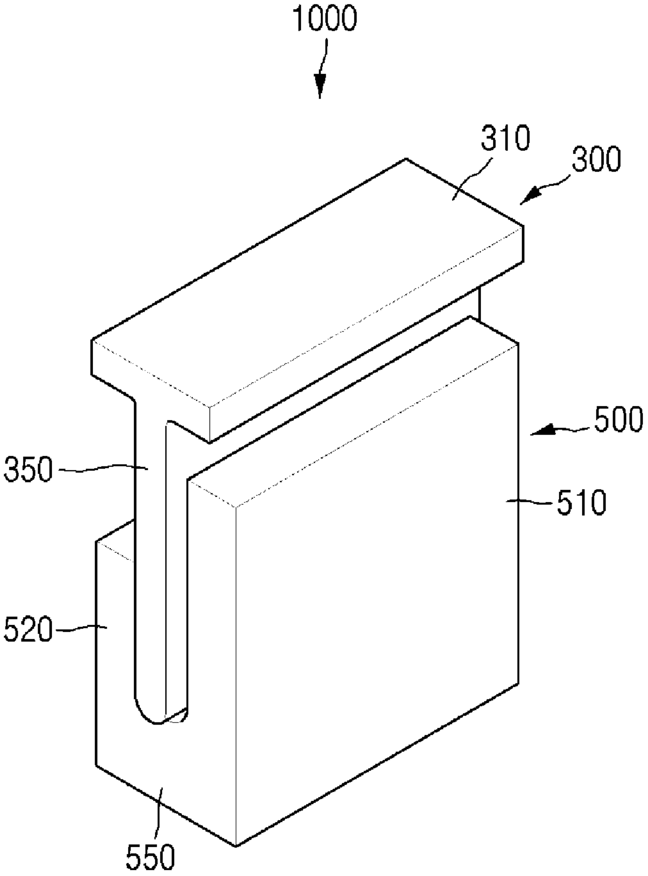
FIG. 9 is a perspective view of the print pad inserted into the cleaner of FIG. 6.
Figure 10:
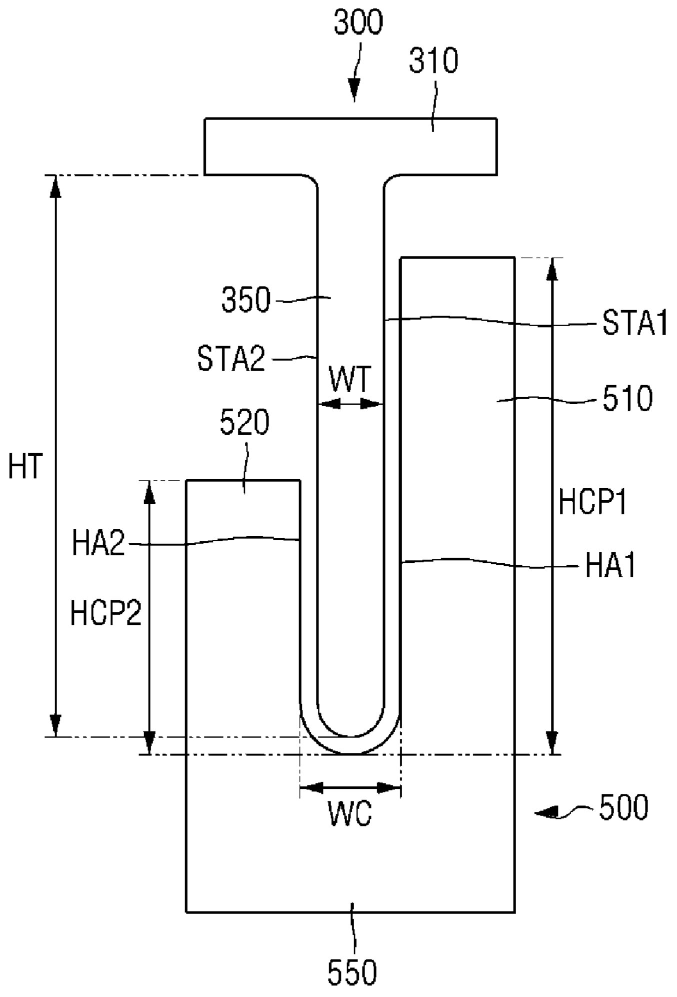
FIG. 10 is a cross-sectional view illustrating the print pad inserted into the cleaner of FIG. 9.
Figure 11:
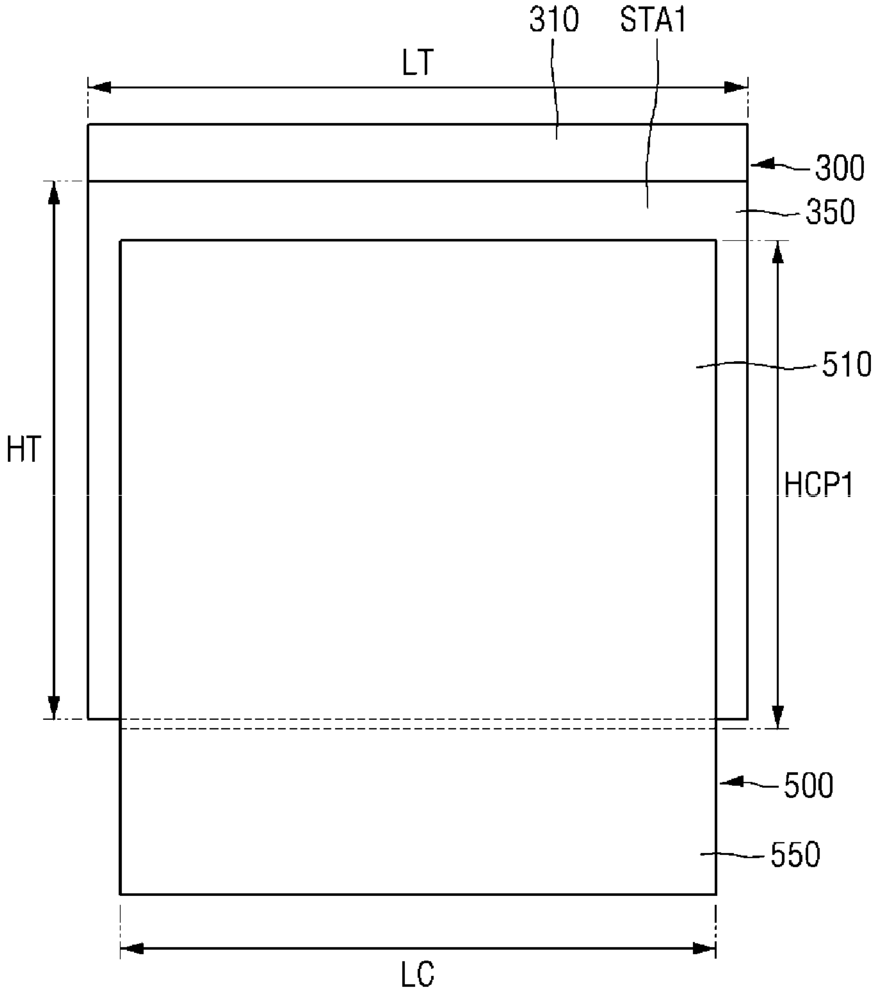
FIG. 11 is a side view illustrating the print pad inserted into the cleaner of FIG. 9.
Figure 12:
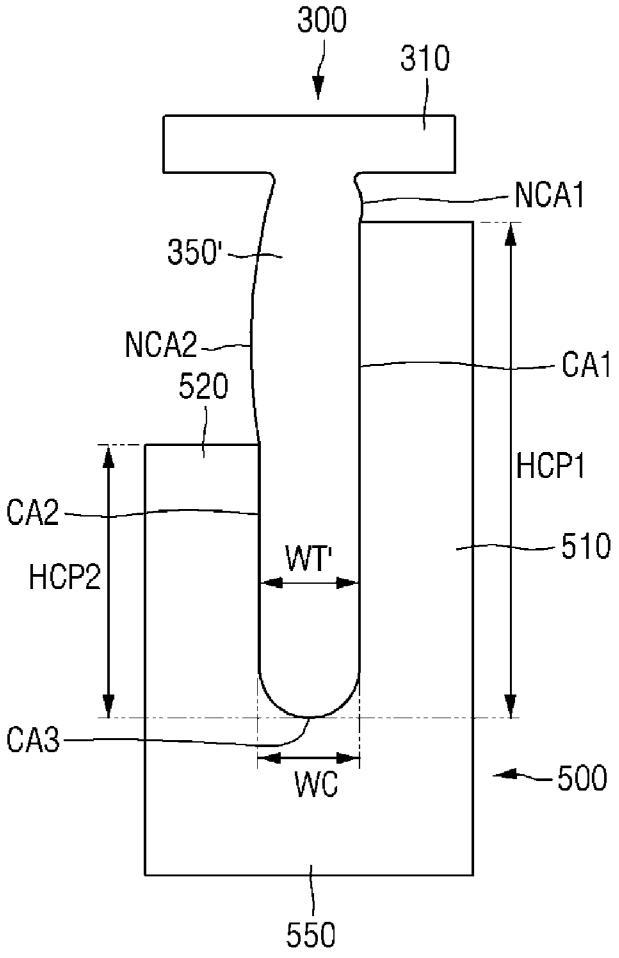
FIG. 12 is a cross-sectional illustrating the print pad being pressed after being inserted into the cleaner of FIG. 9.

FIG. 9 is a perspective view of an exemplary embodiment of a state in which the print pad according to an exemplary embodiment is inserted into the cleaner. FIG. 10 is a cross-sectional view of an exemplary embodiment of the state in which the print pad is inserted into the cleaner of FIG. 9. FIG. 11 is a side view of an exemplary embodiment of the state in which in which the print pad is inserted into the cleaner of FIG. 9. FIG. 12 is a cross-sectional view of an exemplary embodiment of a state in which the print pad according to an exemplary embodiment is pressed after being inserted into the cleaner;

An operation of the printing layer forming apparatus 1000 will be described with reference to FIGS. 9 to 12. The spacer 350 protruding from the print pad 300 in one direction is inserted into the groove HP of the cleaner 500. The thickness WT of the spacer 350 is less than the width WC of the groove HP so that the spacer 350 can be easily inserted into the groove HP. When the spacer 350 is inserted into the groove HP of the cleaner 500 and the spaced is pressed, the form of the spacer 350 is changed by the pressure such that the spacer 350 may contact the groove HP of the cleaner 500.

In this case, the first inner side HA1 and the second inner side HA2 of the groove HP of the cleaner 500 may have forms corresponding to the transparent areas DA of the cover glass 100, and ink in areas of the spacer 350 corresponding to the transparent areas DA of the cover glass 100 is removed.

For example, the first surface STA1 of the spacer 350 may contract the first flat portion SP1 of the base member 10, and the second surface STA2 of the spacer 350 may contact the second flat portion SP2 of the base member 10. Further, the first inner side HA1 of the groove HP of the cleaner 500 may have substantially the same area as the first transparent area DA1 so as to remove ink on a portion, which contacts the first transparent area DA1, of the first surface STA1 of the spacer 350. The second inner side HA2 of the groove HP of the cleaner 500 may have substantially the same area as the second transparent area DA2. When the spacer 350 contacts the cleaner 500 after ink is transferred to the entire outer surface of the spacer 350, the ink on portions, which correspond to the transparent areas DA of the cover glass 100, of the outer surface of the spacer 350 is removed, and the ink on only portions corresponding to the light blocking areas NDA may remain.

In addition, the first surface STA1 and the second surface STA2 of the spacer 350 may have areas greater than areas of the first inner side HA1 and the second inner side HA2 of the groove HP so that ink may remain on the spacer 350 to be printed on the cover glass 100 to form the printing layers 20. Referring to FIGS. 10 and 11, the length LT of the spacer 350 measured in one direction is greater than the length LC of the cleaner 500 measured in the one direction, and the extending first length HT of the spacer 350 is greater than the depths HCP1 and HCP2 of the inner sides HA1 and HA2 of the groove HP. Even when the spacer 350 is inserted into the groove HP of the cleaner 500, a portion of the outer surface of the spacer 350 is exposed so as to not face the inner sides HA1 and HA2 of the groove HP.

As described above, the print pad 300 is formed of a deformable material, e.g., an elastic material, that deforms when a pressure is applied to the print pad 300. According to an exemplary embodiment, when the spacer 350 is pressed in a state in which the spacer 350 is inserted into the groove HP of the cleaner 500, the thickness WT is increased and the spacer 350 may contacts the inner sides HA1 and HA2 of the groove HP of the cleaner 500 (shown in FIG. 12). For example, as the spacer 350 of the print pad 300 is formed of elastic material, which is changeable by a pressure, the spacer 350 may contact the inner sides HA1 and HA2 of the groove HP of the cleaner 500 with a substantially uniformed pressure in contacting areas. As a result, ink transferred to the spacer 350 is easily and precisely removed from the spacer. In more detail, the remaining ink on the spacer may have precise and sharp boundaries or edges corresponding to boundaries between the transparent areas DA and the light blocking areas NDA of the cover glass 100. Therefore, a spacer of a print pad formed of elastic material may improve quality of a light blocking area of a cover glass to form accurate and precise boundaries of the light blocking area of the cover glass.

As illustrated in FIG. 12, when the spacer 350 is pressed, the outer surface of the spacer 350 may contact the groove HP of the cleaner 500. The first surface STA1 of the spacer 350 may contact the first inner side HA1 of the groove HP to form a first contact surface CA1, the second surface STA2 may contact the second inner side HA2 of the groove HP to form a second contact surface CA2, and the round end portion of the spacer 350 may contact the round portion of the groove HP to form a third contact surface CA3. The ink, which is transferred to the first contact surface CA1, the second contact surface CA2, and the third contact surface CA3, among the ink transferred to the spacer 350 is removed by the cleaner 500. As described above, the groove HP of the cleaner 500 may have a form corresponding to the transparent areas DA of the cover glass 100, and portions, from which the ink is removed, of the outer surface of the spacer 350 contacts the transparent areas DA of the base member 10.

Areas of the first surface STA1 and the second surface STA2 of the spacer 350 is greater than the areas of the inner sides HA1 and HA2 of the groove HP, and non-contact surfaces NCA1 and NCA2 is formed in areas which are exposed and do not face the inner sides HA1 and HA2. For example, ink may remain on the first non-contact surface NCA1, which does not contact the groove HP, of the first surface STA1 of the spacer 350 and the second non-contact surface NCA2, which does not contact the groove HP, of the second surface STA2. The ink on the first non-contact surface NCA1 and the second non-contact surface NCA2 of the spacer 350 may remain at positions corresponding to the light blocking areas NDA of the cover glass 100 and may contact the base member 10 to form the printing layers 20. Further, some ink may remain on the round end portion of the spacer 350, and the some ink is used to form the printing layers 20 corresponding to the light blocking areas NDA positioned in the bending portion BP of the cover glass 100.

As described above, the printing layer forming apparatus 1000 may include the print pad 300 and the cleaner 500 having forms corresponding to the form of a target object on which the printing layers are formed. The print pad 300 may include the spacer 350 contactable with the target object, and the cleaner 500 may include the groove HP into which the spacer 350 is insertable. According to an exemplary embodiment, the cover glass 100 having the form surrounding the predetermined space as illustrated in FIG. 1 is fabricated by forming the printing layers 20 on one surface of the base member 10 using the print pad 300 of the printing layer forming apparatus 1000 of FIG. 6.

Hereinafter, a method of fabricating the cover glass 100 in which the printing layers 20 are formed on the base member 10 using the printing layer forming apparatus 1000 according to an exemplary embodiment will be described.

Figure 13:
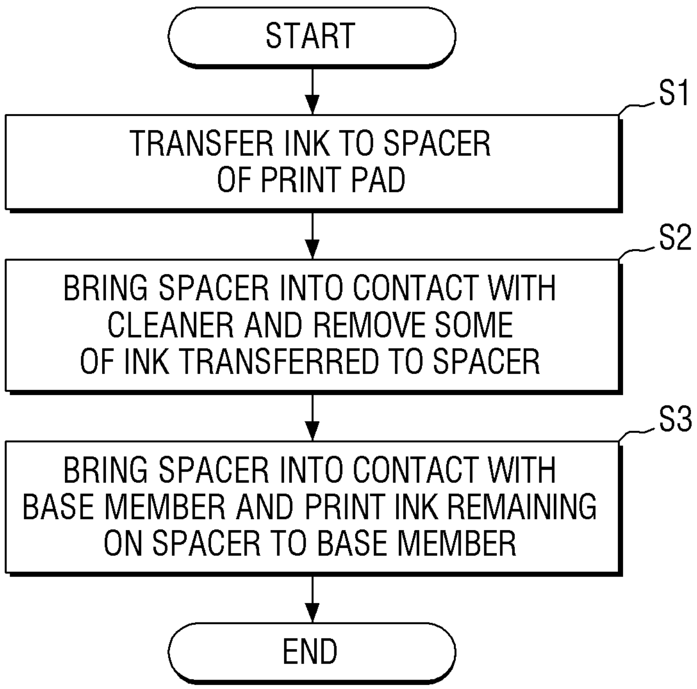
FIG. 13 is a flowchart of an exemplary embodiment of a method of fabricating a cover glass according to the principles of the invention.

FIG. 13 is a flowchart of a method of fabricating the cover glass constructed according to the principles of the invention. Referring to FIG. 13, a method of fabricating the cover glass 100 according to an exemplary embodiment may include a step of transferring ink to the spacer 350 of the print pad 300 (S1), a step of bringing the spacer 350 into contact with the cleaner 500 and removing some of the ink transferred to the spacer 350 (S2), and a step of bringing the spacer 350 into contact with the base member 10 and printing the ink, which remains on the spacer 350, to the base member 10 (S3). In the step of removing of the some of the ink transferred to the spacer 350 (S2), the spacer 350 is inserted into the groove HP of the cleaner 500, and in the step of printing of the ink on the base member 10 (S3), the spacer 350 is inserted into the predetermined space surrounded by the base member 10. The print pad 300 of the printing layer forming apparatus 1000 may form the printing layers 20 on one surface of the base member 10 through a process in which the print pad 300 is inserted into the cleaner 500 and the base member 10.

Figure 14:
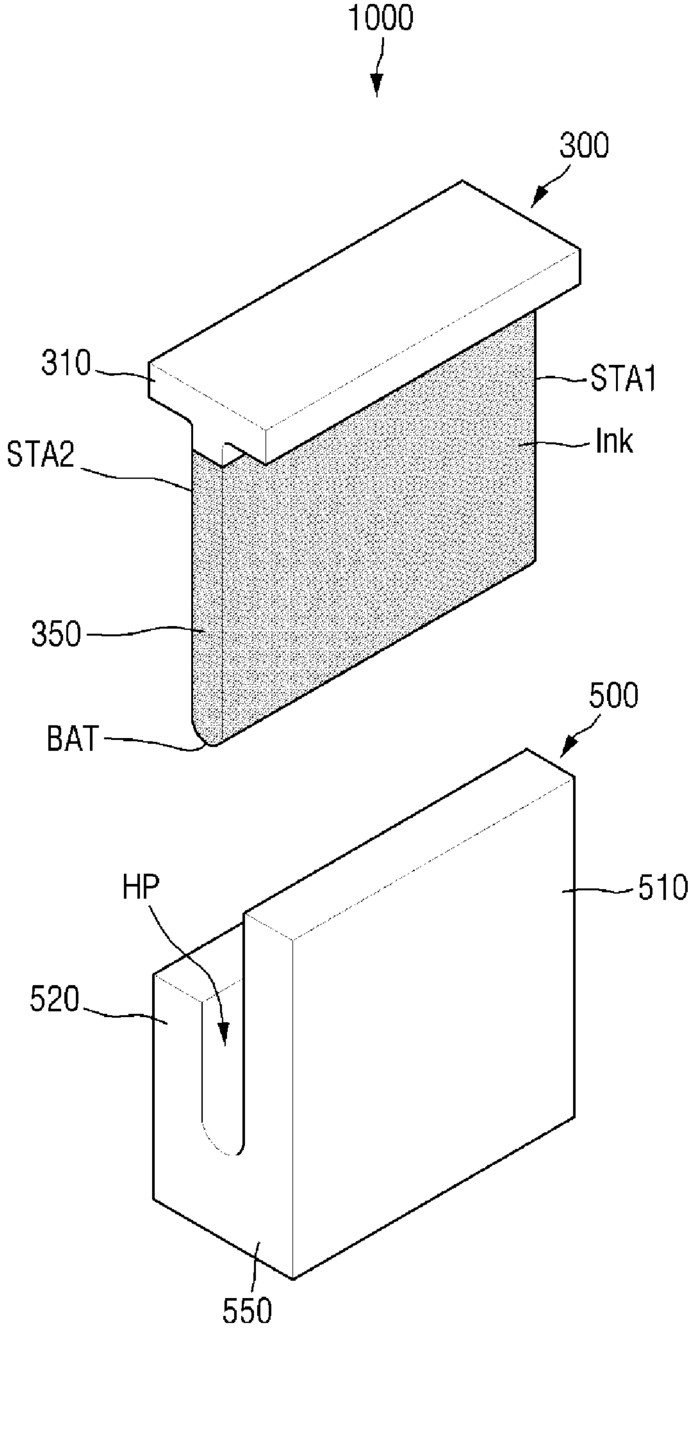
FIG. 14 is a perspective view illustrating one operation of a process of fabricating the cover glass.

FIG. 14 is a perspective view illustrating one operation of a process of fabricating the cover glass constructed according to the principles of the invention. First, referring to FIG. 14, ink INK is transferred to the print pad 300 of the printing layer forming apparatus 1000 (S1), and the cleaner 500 including the groove HP is provided. According to an exemplary embodiment, the ink INK is transferred to only the spacer 350 of the print pad 300. The ink INK is transferred to the first surface STA1 and the second surface STA2 which are flat and may be transferred to a round end portion BAT which is curved. In an exemplary embodiment, the process of transferring the ink INK to the spacer 350 of the print pad 300 is performed through a dipping process, a spray process, or the like. However, the exemplary embodiments are not limited thereto. Some ink INK transferred to the outer surface of the spacer 350 is removed by the cleaner 500 through the following process.

Figure 15:
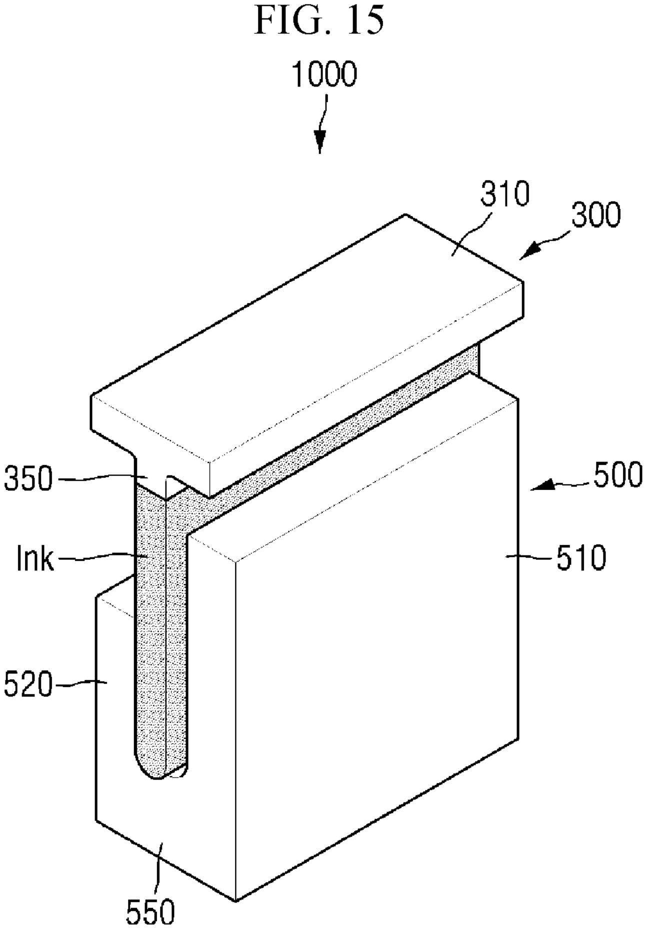
FIG. 15 is a perspective view illustrating one operation of the process of fabricating the cover glass.
Figure 16:
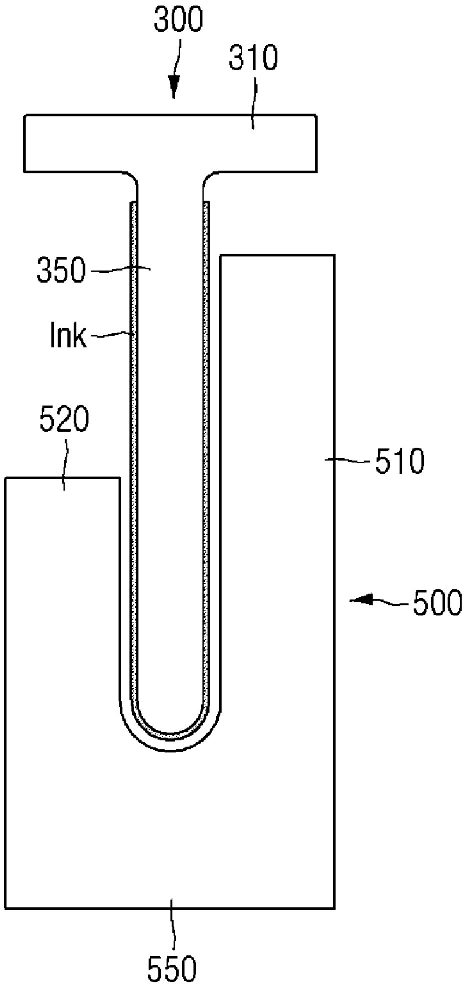
FIG. 16 is a cross-sectional view illustrating the one operation of the process of fabricating the cover glass of FIG. 15.

FIG. 15 is a perspective view illustrating one operation of the process of fabricating the cover glass constructed according to the principles of the invention. FIG. 16 is a cross-sectional view illustrating one operation of the process of fabricating the cover glass of FIG. 15.

Referring to FIGS. 15 and 16, the spacer 350, to which the ink INK is transferred, of the print pad 300 is inserted into the groove HP of the cleaner 500. As described above, the groove HP, into which the spacer 350 of the print pad 300 is inserted, is formed in the cleaner 500. The groove HP of the cleaner 500 may have the width WC greater than the thickness WT of the spacer 350 so that the spacer 350 is easily inserted into the groove HP. The spacer 350 including the ink INK is inserted into the groove HP of the cleaner 500 in a state in which the spacer 350 and the groove HP are spaced apart from each other. Referring to FIG. 16, the ink INK transferred to the outer surface of the spacer 350 is spaced apart from and face the inner sides HA1 and HA2 of the groove HP of the cleaner 500.

Figure 17:
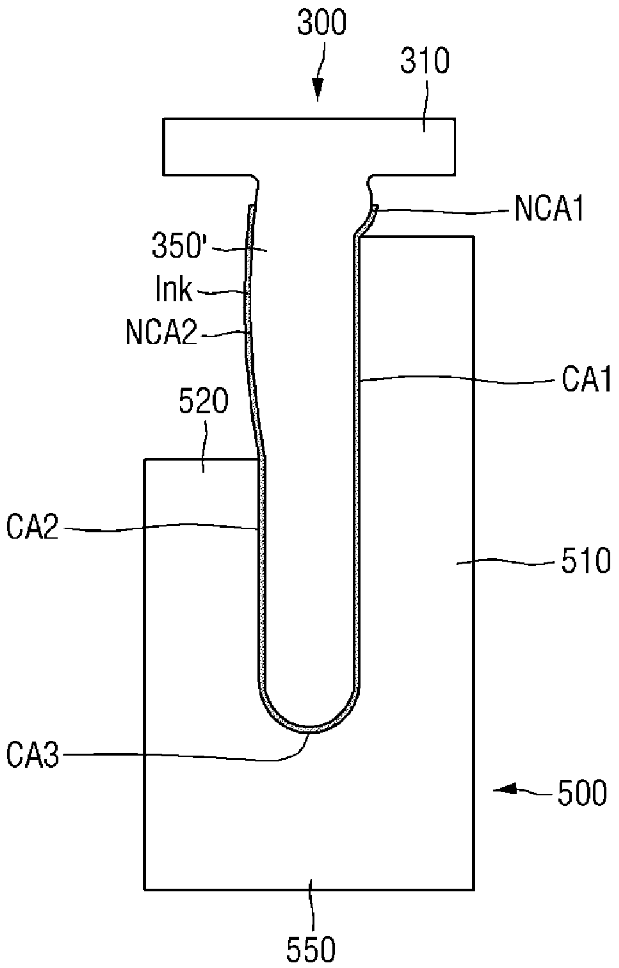
FIG. 17 is a cross-sectional view illustrating one operation of the process of fabricating the cover glass in which the print pad is pressed into the cleaner.

FIG. 17 is a cross-sectional view illustrating one operation of the process of fabricating the cover glass constructed according to the principles of the invention. Referring to FIG. 17, the print pad 300 inserted into the cleaner 500 is pressed to make a portion of the outer surface of the spacer 350 contact the inner sides HA1 and HA2 of the groove HP. The print pad 300 may be formed of an elastic material, which is deformable by an external force, and when the print pad 300 is pressed in a state in which the print pad 300 is inserted into the groove HP of the cleaner 500, the thickness of the spacer 350 is changed and the print pad 300 contacts the inner sides HA1 and HA2 of the groove HP (see a deformed spacer 350' of FIG. 17). For example, the spacer 350 is changed to the deformed spacer 350' when the print pad 300 is pressed in a state in which the print pad 300 is inserted into the groove HP of the cleaner 500. In more detail, when the spacer 350 is pressed in a vertical direction, the thickness of the spacer 350 is increased in a horizontal direction to become the deformed spacer 350. The deformed spacer 350' contacts the inner sides HA1 and HA2 of the groove HP to form the first contact surface CA1, the second contact surface CA2, and the third contact surface CA3. Further, since a first surface STA1 and a second surface STA2 of the deformed spacer 350' have areas greater than the areas of the inner sides HA1 and HA2 of the groove HP of the cleaner 500, at least a partial area of the deformed spacer 350' form non-contact surfaces NCA1 and NCA2 which do not contact the groove HP. For example, the first non-contact surface NCA1, which does not contact the groove HP, of the first surface STA1 of the deformed spacer 350', is formed and the second non-contact surface NCA2, which does not contact the groove HP, of the second surface STA2 is formed. The ink INK transferred to contact surfaces CA1, CA2, and CA3, which contact the groove HP, of an outer surface of the deformed spacer 350' is removed by the cleaner 500, and the ink INK transferred to the non-contact surfaces NCA1 and NCA2 may remain on the outer surface of the deformed spacer 350'.

As described above, the groove HP having a form corresponding to the form of a target object on which the printing layers 20 are formed is formed in the cleaner 500, and the first sidewall 510 and the second sidewall 520 of the cleaner 500 may have different heights. According to an exemplary embodiment, the non-contact surfaces NCA1 and NCA2, which do not contact the groove HP, of the outer surface of the deformed spacer 350' may have different areas. For example, referring to FIGS. 6-8, the length HC1 of the first sidewall 510 of the cleaner 500 or the depth HCP1 of the first inner side HA1 of the cleaner 500 is greater than the length HC2 of the second sidewall 520 or the depth HCP2 of the second inner side HA2. For example, the first inner side HA1 of the groove HP of the cleaner 500 may have an area greater than the area of the second inner side HA2 of the cleaner 500. Referring to FIG. 12, the first non-contact surface NCA1 of the deformed spacer 350' may have the area greater than the area of the second non-contact surface NCA2 of the deformed spacer 350'. However, the exemplary embodiments are not limited thereto. For example, the form of the print pad 300 or the cleaner 500 of the printing layer forming apparatus 1000 may be modified according to the form of a target object on which the printing layers 20 are formed. In some exemplary embodiments, the first sidewall 510 and the second sidewall 520 of the cleaner 500 may have substantially the same form and a symmetrical structure, and the non-contact surfaces NCA1 and NCA2 of a deformed spacer 350' may have substantially the same area.

Figure 18:
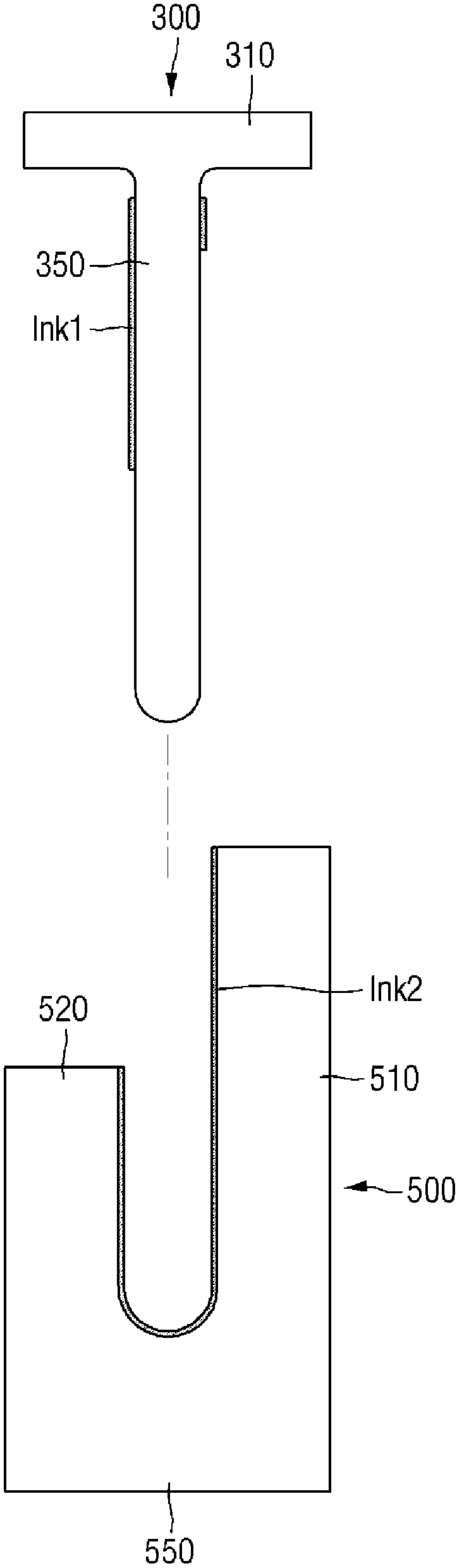
FIG. 18 is a cross-sectional view illustrating one operation of the process of fabricating the cover glass in which the printing pad is inserted into the cleaner.
Figure 19:
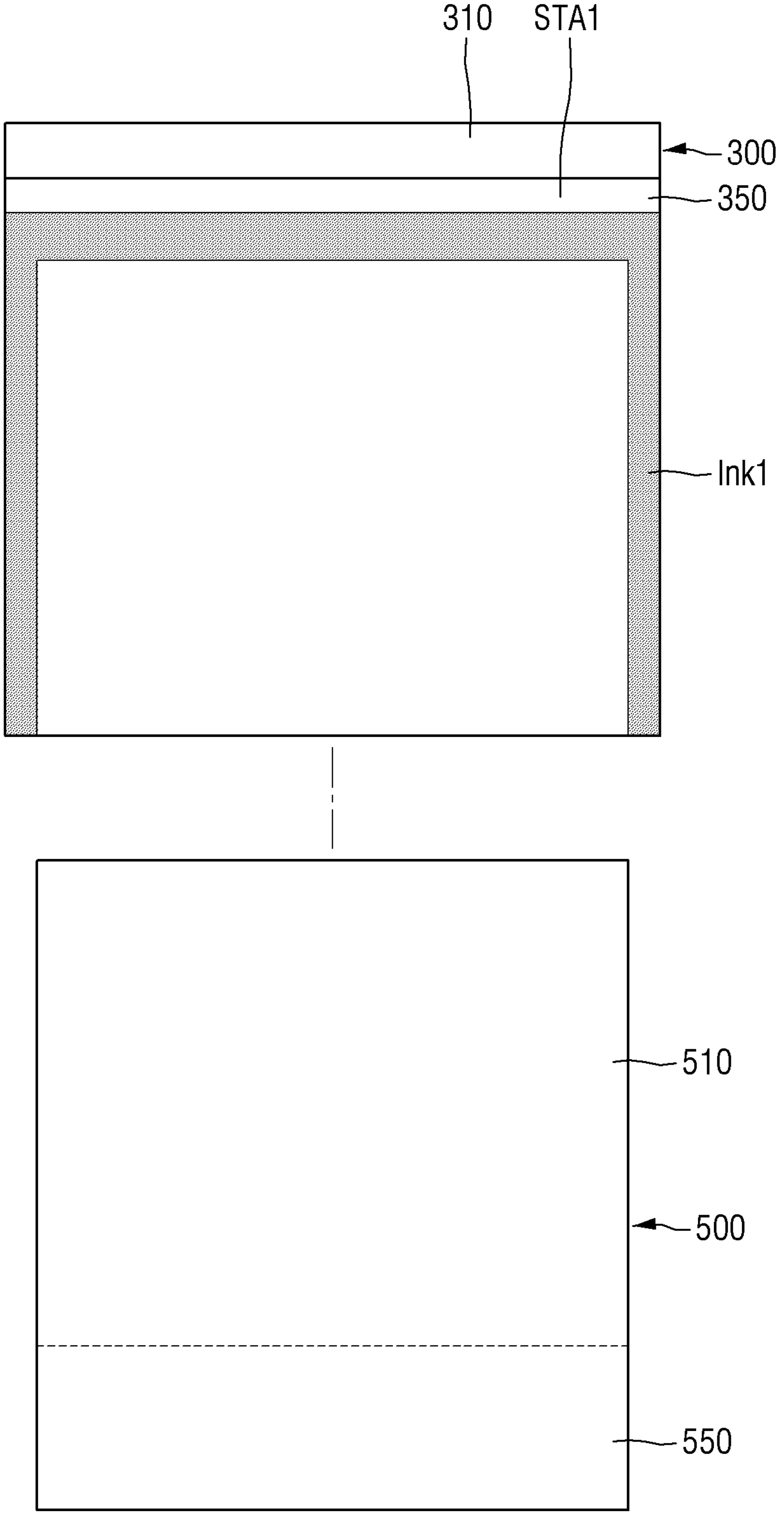
FIG. 19 is a schematic view illustrating a state in which some ink transferred to the print pad during the process of fabricating the cover glass is removed.

FIG. 18 is a cross-sectional view illustrating one operation of the process of fabricating the cover glass according to an exemplary embodiment. FIG. 19 is a perspective view of a state in which some ink transferred to the print pad during the process of fabricating the cover glass is removed according to an exemplary embodiment.

Referring to FIGS. 18 and 19, the print pad 300 is separated from the cleaner 500 and some ink INK transferred to the spacer 350 is removed (S3). For example, when a gravitational force between the ink INK and the spacer 350 is greater than a gravitational force between the ink INK and the cleaner 500, the ink INK on the cleaner 500 is transferred to the inner sides HA1 and HA2 of the groove HP of the cleaner 500 after the spacer 350 contacts the groove HP of the cleaner 500*is*. Some of the ink INK (e.g., Ink1 of FIG. 18) on the spacer 350 may remain on the non-contact surfaces NCA1 and NCA2 of the spacer 350, and other ink (e.g., Ink2 of FIG. 18) on the cleaner 500, which is on the contact surfaces CA1, CA2, and CA3 contacting with the groove HP, may be transferred to the inner sides HA1 and HA2 of the groove HP of the cleaner 500. The ink INK1 may remain on the spacer 350 and is used to form to the printing layers 20 on the target object. An exemplary embodiment of the cover glass 100 of FIG. 1 will be described. For example, the ink INK1 transferred to an edge, except for a central portion, of the spacer 350 may remain. The ink INK1 remaining on the spacer 350 is ink remaining on the spacer 350 to correspond to the light blocking areas NDA on the base member 10, and ink on portions corresponding to the transparent areas DA is removed by the cleaner 500. Alternatively, a position of the ink INK1 remaining on the spacer 350 and a position of the ink INK2 removed from the spacer 350 may be variously changed according to the form of the target object, positions of the printing layers 20, and the like.

Figure 20:
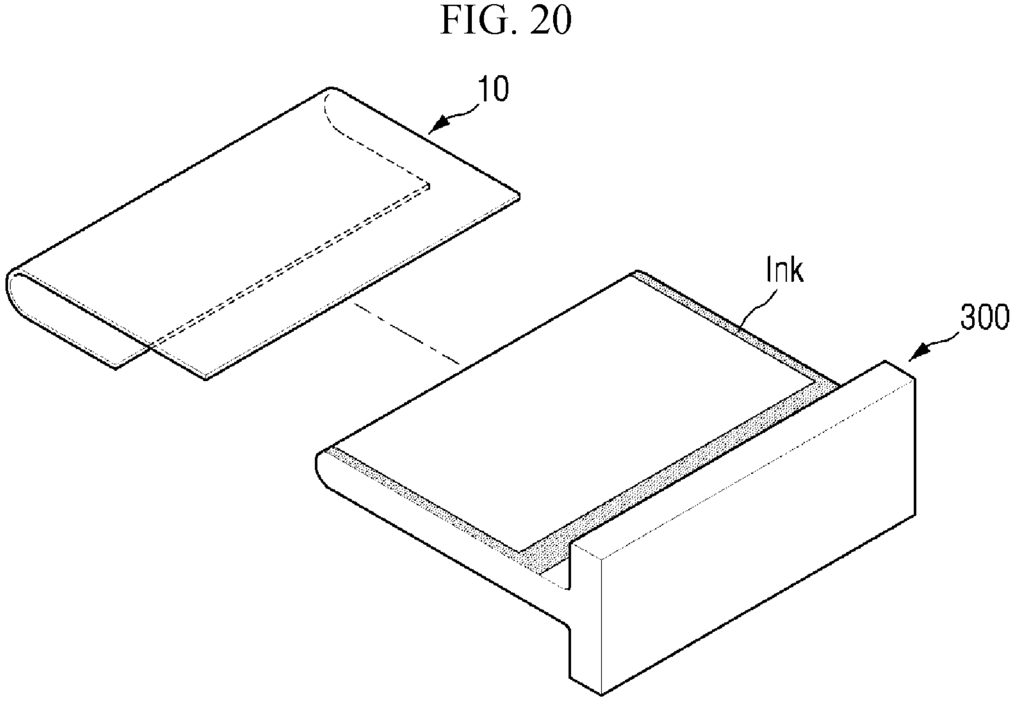
FIG. 20 is a perspective view illustrating one operation of the process of fabricating the cover glass in which the cover glass is to be inked by being inserted onto the printing pad.

FIG. 20 is a perspective view illustrating one operation of the process of fabricating the cover glass constructed according to the principles of the invention. Referring to FIG. 20, the spacer 350, on which the some ink INK1 remains, of the print pad 300 contacts the target object to form the printing layers 20. For example, when the target object is the base member 10 of the cover glass 100 of FIG. 1, the spacer 350 of the print pad 300 is inserted into a region surrounded by the flat portions SP1 and SP2 and the bending portion BP of the base member 10. The ink INK1 remaining on the outer surface of the spacer 350 contacts one surface of the base member 10, and the ink INK1 on the outer surface of the spacer 350 is transferred to one surface of the base member 10 to form the printing layers 20. In this case, a partial area of the second non-contact surface NCA2 of the spacer 350 contacts the second flat portion SP2 of the base member 10. Further, only ink INK1 on the partial area of the second non-contact surface NCA2 of the spacer 350 is transferred to an edge of the second flat portion SP2, and remaining ink INK1 on other areas of the second non-contact surface NCA2 of the spacer 350, which does not contact the second flat portion SP2 of the base member 10, remains on the spacer 350. In more detail, some ink INK1 may remain on the round end portion BAT of the spacer 350 corresponding to the bending portion BP of the base member 10, and the some ink INK1 on the round end portion BAT of the spacer 350 may be transferred to an edge of the bending portion BP of the base member 10 to form the printing layer 20.

The printing layers 20 are disposed on one surface of the base member 10, which faces a space surrounded by the first flat portion SP1, the second flat portion SP2, and the bending portion BP of the base member 10. For example, the printing layers 20 are disposed on an edge of the one surface of the base member 10. As described above, the printing layers 20 may form the light blocking areas NDA of the cover glass 100, and the areas, in which the printing layers 20 are not disposed, are the transparent areas DA of the cover glass 100.

Through the above process, the printing layer forming apparatus 1000 according to an exemplary embodiment may fabricate the cover glass 100 in which the printing layers 20 are disposed on the base member 10. The printing layer forming apparatus 1000 may include the print pad 300 and the cleaner 500 having forms corresponding to the form of the target object, for example, the base member 10 on which the printing layers 20 are formed. The ink INK transferred to the print pad 300 is partially removed by the cleaner 500, and the ink INK remaining on the print pad 300 contacts the target object to form the printing layers 20.

The print pad 300 and the cleaner 500 of the printing layer forming apparatus 1000 may have forms corresponding to the form of the target object. Unlike the embodiment of FIG. 1, in a case in which the cover glass 100 includes the first flat portion SP1 and the second flat portion SP2 which have a symmetrical structure, the cleaner 500 of the printing layer forming apparatus 1000 may also have the first sidewall 510 and the second sidewall 520 which have a symmetrical structure.

Figure 21:
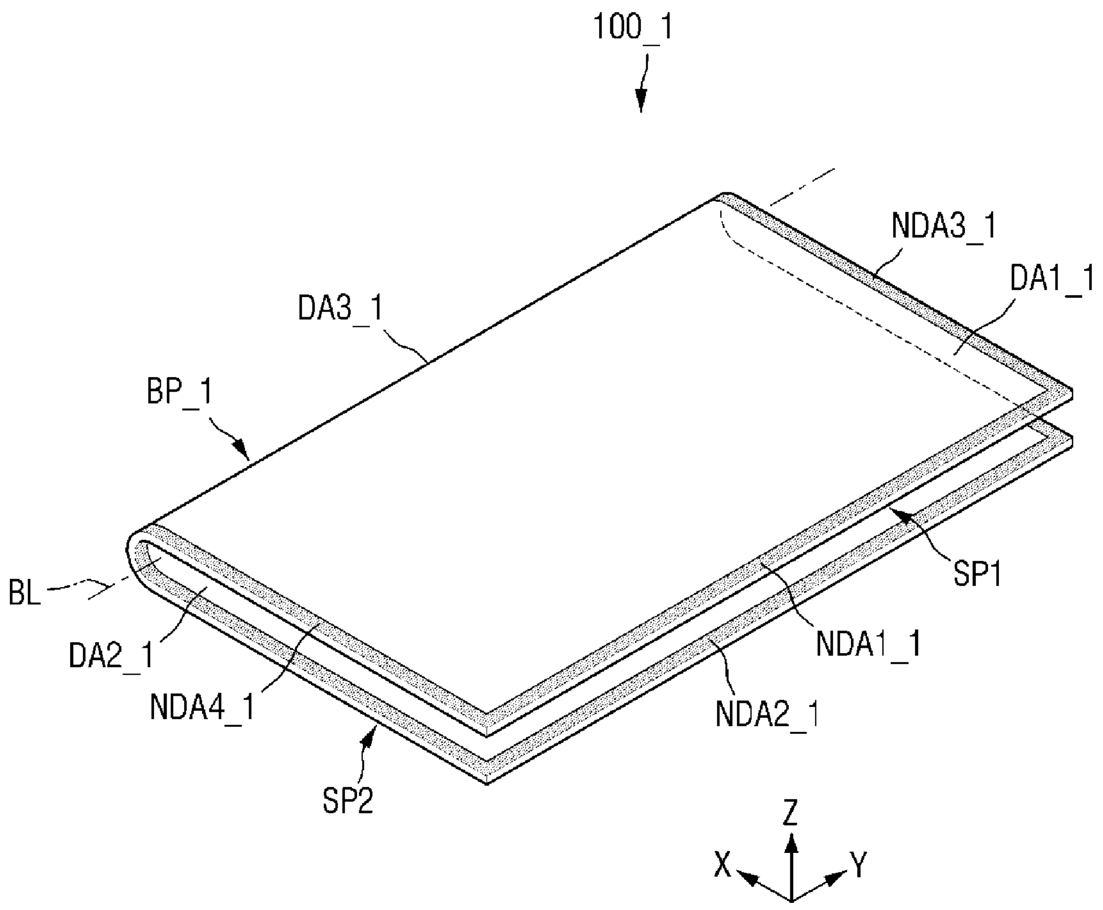
FIG. 21 is a perspective view of an exemplary embodiment of a cover glass constructed according to the principles of the invention.
Figure 22:
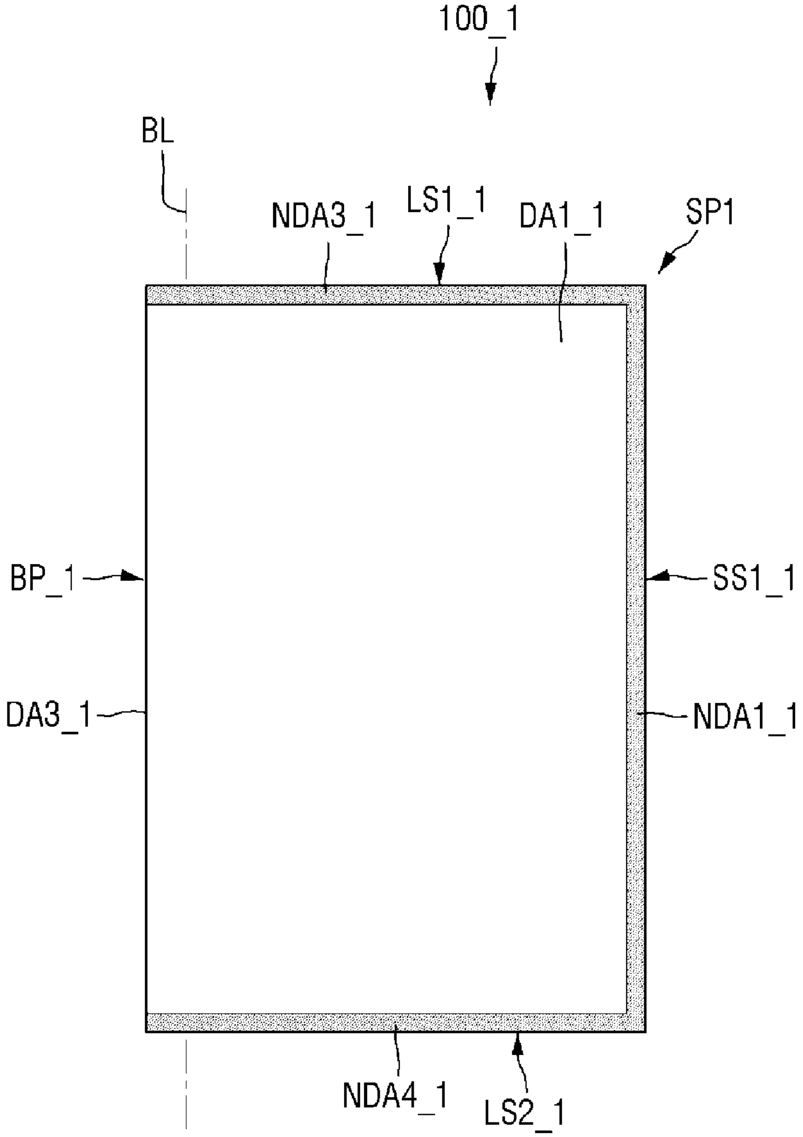
FIG. 22 is a plan view of the cover glass of FIG. 21.
Figure 23:
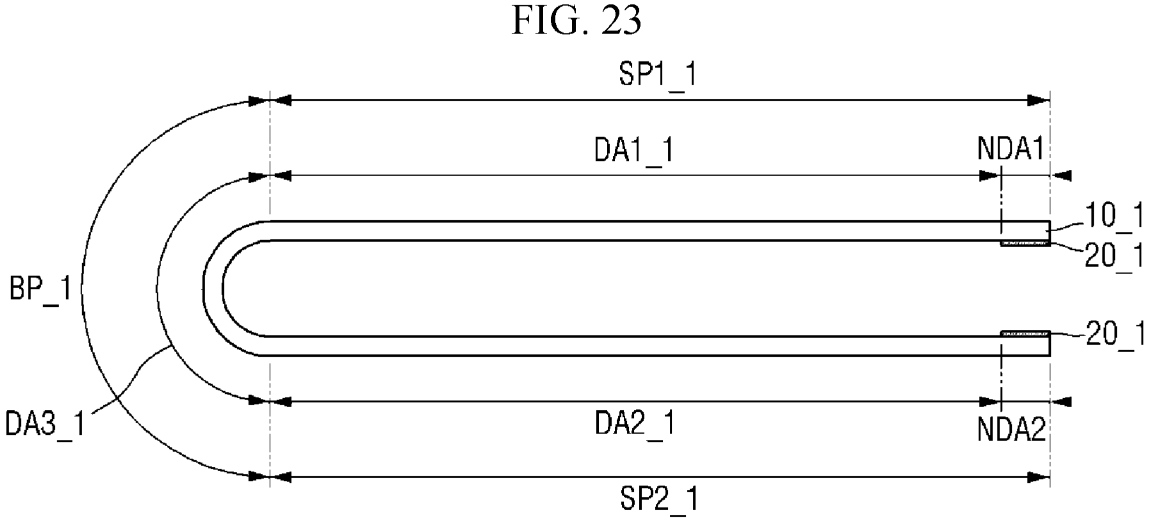
FIG. 23 is a cross-sectional view of the cover glass of FIG. 21.

FIG. 21 is a perspective view of a cover glass constructed according to the principles of the invention. FIG. 22 is a plan view of the cover glass of FIG. 21. FIG. 23 is a cross-sectional view of the cover glass of FIG. 21.

Referring to FIGS. 21 to 23, in a cover glass 100_1 according to an exemplary embodiment, a second flat portion SP2 may have the same area as a first flat portion SP1. For example, the first flat portion SP1 and the second flat portion SP2 of the cover glass 100_1 may have a symmetrical structure. This illustrated embodiment is different from the embodiment of the FIG. 1 in that the form of the second flat portion SP2 is different therefrom. Hereinafter, repeated descriptions of like or similar elements will be omitted to avoid redundancy.

Referring to FIGS. 21 to 23, a portion, which corresponds to the first flat portion SP1, of longitudinal sides LS1_1 and LS2_1 of the cover glass 100_1 may have substantially the same length as a portion corresponding to the second flat portion SP2. Accordingly, the substantially the entire second flat portion SP2 is spaced apart from and opposes substantially the entire first flat portion SP1. For example, a first short side SS1_1 and a second short side SS2_1 of the cover glass 100_1 may face each other. For example, the cover glass 100_1 may include a first transparent area DA1_1, a second transparent area DA2_1, and a third transparent area DA3_1, and first to fourth light blocking areas NDA1_1, NDA2_1, NDA3_1, and NDA4_1. The first transparent area DA1_1 and the second transparent area DA2_1 of the cover glass 100-1 may have substantially the same area as each other. Further, the first light blocking area NDA1_1 and the second light blocking area NDA2_1 may overlap each other in one direction.

Referring to FIG. 21, a base member 10_1 of the cover glass 100_1 may have substantially a symmetrical structure with respect to a bending line BL, and printing layers 20_1 may be disposed on one surface facing a space surrounded by the base member 10_1. Since areas of first and second flat portions SP1_1 and SP2_1 of the base member 10_1 are substantially equal and areas of the first and second transparent areas NDA1_1 and NDA2_1 are substantially equal, the position at which ink INK remains on a print pad 300 of the printing layer forming apparatus 1000 is changed. For example, referring to FIG. 24, in the printing layer forming apparatus 1000, areas of a first inner side HA1 and a second inner side HA2 of a groove HP of a cleaner 500 corresponding to transparent areas DA_1 of the cover glass 100_1 may have t substantially the same area.

Figure 24:
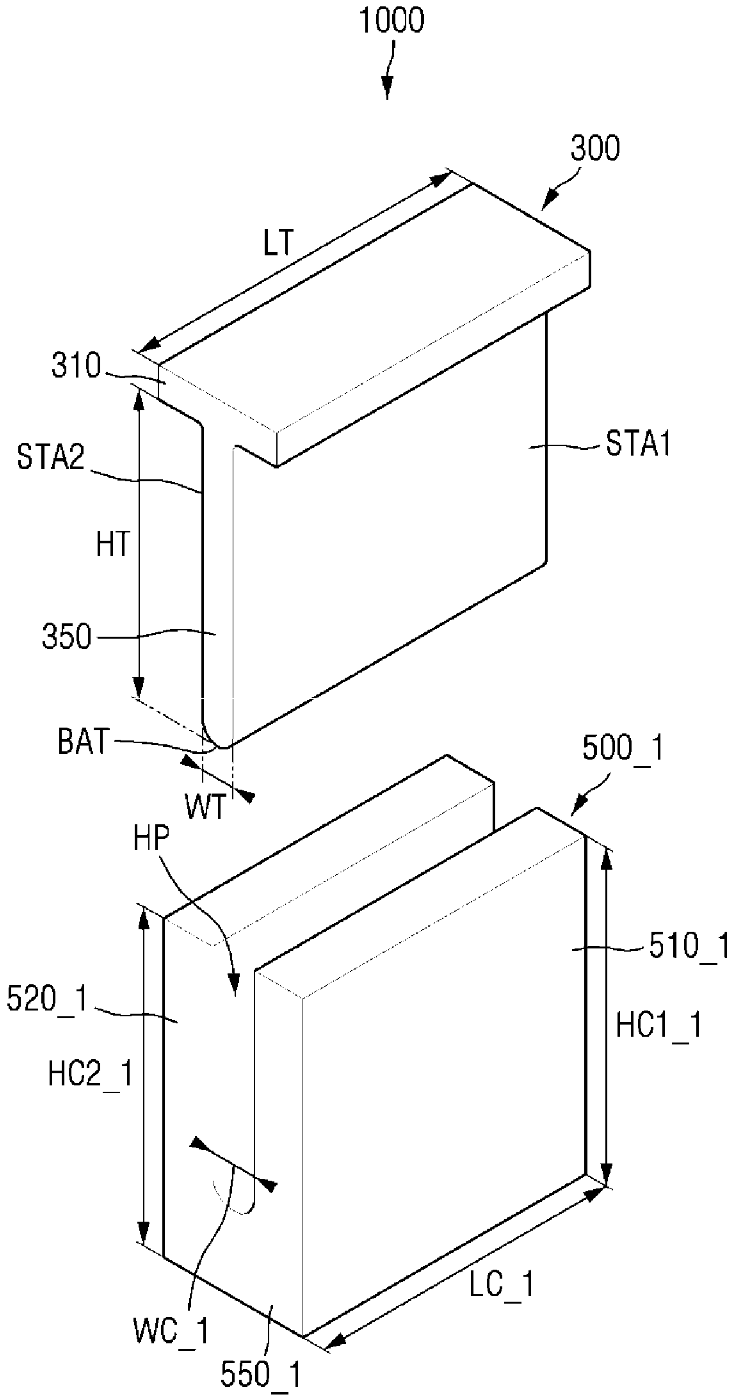
FIG. 24 is a perspective view of another exemplary embodiment of a printing layer forming apparatus constructed according to the principles of the invention.

FIG. 24 is a perspective view of a printing layer forming apparatus constructed according to the principles of the invention. Referring to FIG. 24, in the printing layer forming apparatus 1000 according to an exemplary embodiment, a first sidewall 510_1 and a second sidewall 520_1 of the cleaner 500_1 may have substantially the same lengths HC1 and HC2. Accordingly, a first inner side HA1 and a second inner side HA2 of a groove HP of the cleaner 500_1 may have substantially the same area. The illustrated embodiment is different from the embodiment of the FIG. 6 in that the second sidewall 520_1 of the cleaner 500_1 has a higher height. Hereinafter, repeated descriptions of like or similar elements will be omitted to avoid redundancy.

Referring to FIG. 24, the first sidewall 510_1 and the second sidewall 520_1 of the cleaner 500_1 of the printing layer forming apparatus 1000 may have substantially the same height and may have a symmetrical form with respect to the groove HP. For example, since the first sidewall 510_1 and a second main body 550_1 of the cleaner 500_1 have substantially the same form as the embodiment of FIG. 6 and the second sidewall 520_1 is formed to be higher when compared to the embodiment of FIG. 6, the first inner side HA1 and the second inner side HA2 of the groove HP may have substantially the same depths HCP1 and HCP2, respectively.

The cleaner 500_1 may have a form corresponding to transparent areas DA of the cover glass 100_1 of FIG. 24. In a case in which a spacer 350 is inserted into the groove HP of the cleaner 500_1, contact surfaces CA1, CA2, and CA3 formed by bringing the spacer 350 into contact with the groove HP of the cleaner 500_1 may be regions corresponding to the transparent areas DA of the cover glass 100_1.

Figure 25:
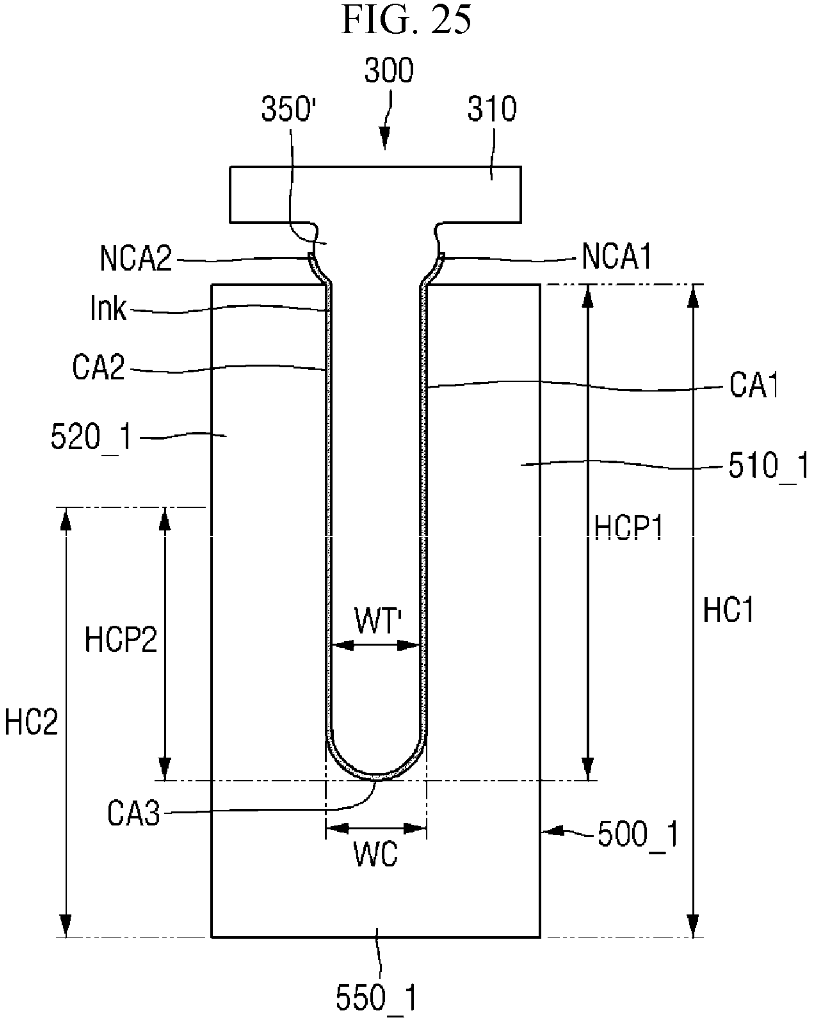
FIG. 25 is a cross sectional view illustrating the print pad being inserted into the cleaner of FIG. 24.
Figure 26:
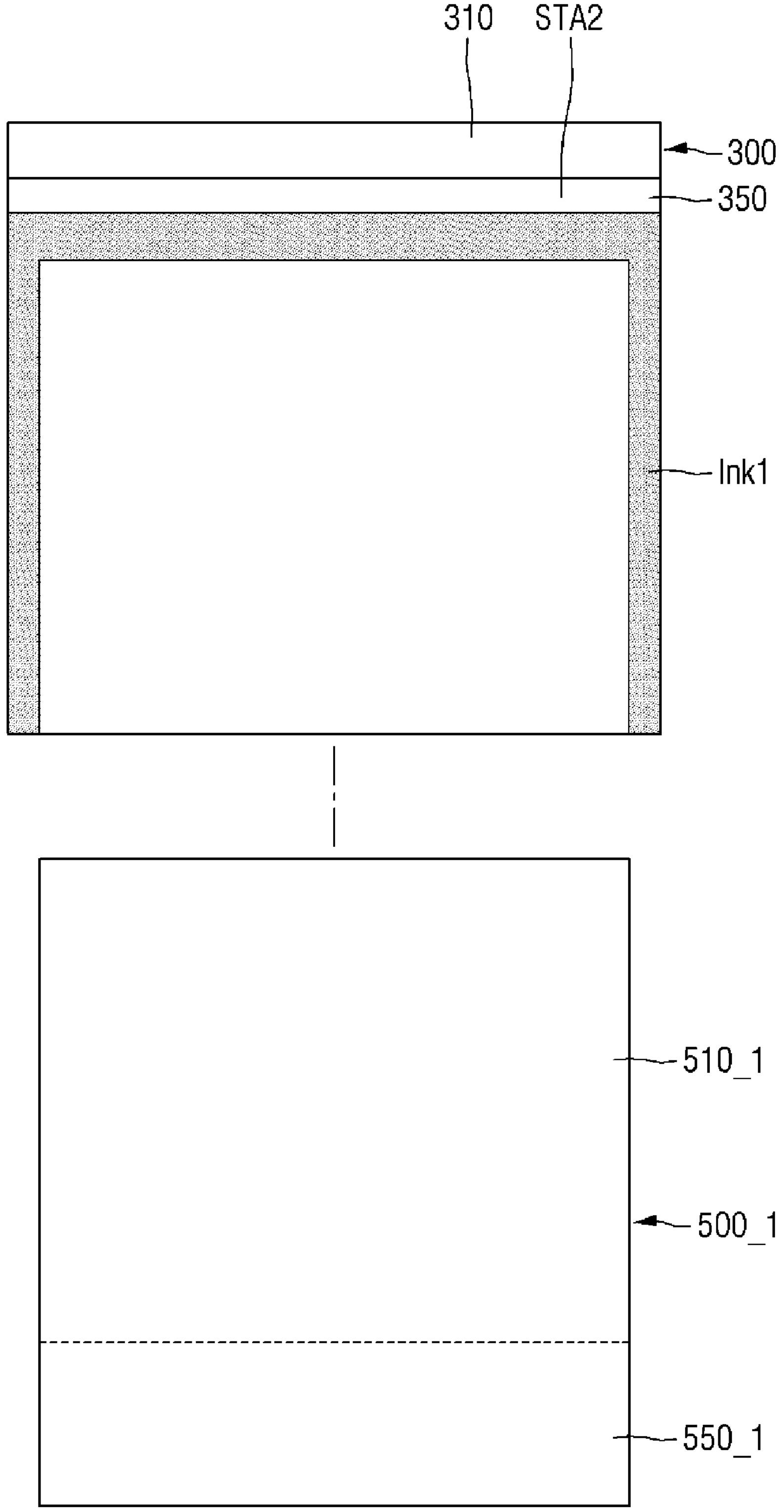
FIG. 26 is a schematic view illustrating a portion of ink transferred to the print pad during a process of fabricating the cover glass being removed by the cleaner of FIG. 24.

FIG. 25 is a perspective view of a state in which a print pad according to another exemplary embodiment is inserted into a cleaner. FIG. 26 is a perspective view of a state in which some ink transferred to the print pad during a process of fabricating the cover glass according to another exemplary embodiment is removed.

Referring to FIGS. 25 and 26, when a spacer 350 of the print pad 300 is inserted into the groove HP of the cleaner 500_1 and is pressed, the spacer 350 is changed to a deformed spacer 350'. For example, an outer surface of the deformed spacer 350' may contact the groove HP to form the contact surfaces CA1, CA2, and CA3. For example, since the depth HCP2 of the second sidewall 520_1 the cleaner 500_1 is deeper than that of the deformed spacer 350' in FIG. 17, an area of the second contact surface CA2 at which the deformed spacer 350' contacts the second inner side HA2 of the groove HP may increase.

For example, first and second non-contact surfaces NCA1 and NCA2, which are exposed and at which the deformed spacer 350' does not come into contact the groove HP, may have substantially the same area. Accordingly, ink INK remaining on only an edge of the spacer 350 may form printing layers 20 on one surface of the base member 10_1 corresponding to the light blocking areas NDA of the cover glass 100_1 of FIG. 21. This exemplary embodiment is substantially the same as the above described embodiments except that the form of the cleaner 500_1 is different therefrom so that a position at which ink INK remains on the spacer 350 is different therefrom. Remaining repeated descriptions of like or similar elements will be omitted to avoid redundancy.

Printing layer forming apparatus constructed according to the principles and exemplary embodiments of the invention includes a print pad having a form protruding in one direction to correspond to the form of a target object and a cleaner in which a groove is formed so that a protruding portion of the print pad is inserted into the groove. When ink is transferred to the protruding portion of the print pad, the protruding portion of the print pad can be inserted into the groove of the cleaner and some of the ink can be removed. In the printing layer forming apparatus, the print pad and the cleaner may have specific forms corresponding to the form of the target object on which a printing layer is formed and a position at which the printing layer is disposed.

In addition, exemplary methods according to the principles and exemplary embodiments of the invention can be used to fabricate a cover glass for a display device in which a printing layer is formed on a base member including a bending portion which is bent and a flat portion which is substantially flat using the printing layer forming apparatus. Even when the base member has a form surrounding a specific space, a print pad of the printing layer forming apparatus can be inserted into the surrounded space, and the printing layer is formed on one surface, which opposes the surrounded space, of surfaces of the base member.

Although certain exemplary embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. A method of fabricating a cover glass for a display device, the method comprising:

transferring ink to a printing member having a first main body and a projection extending from one surface of the first main body in one direction;

inserting the printing member into a first space in a cleaning member and removing at least a portion of the ink transferred to the printing member and contacting the printing member with a base member of the cover glass and forming a printing layer on one surface of the base member, wherein the base member comprises:

a first flat portion;

a second flat portion spaced apart from the first flat portion; and a bending portion connecting the first flat portion and the second flat portion, the bending portion being bent in one direction, wherein the step of forming the printing layer comprises inserting the projection in a second space defined by the first flat portion and the second flat portion such that the projection contacts one surface of the base member, and the ink remaining on the projection is printed on the one surface of the base member.

2. The method of fabricating a cover glass of claim 1, wherein the step of transferring the ink to the printing member comprises transferring the ink only to an outer surface of the projection.

3. The method of fabricating a cover glass of claim 2, wherein the step of removing the at least a portion of the ink comprises pressing the printing member into the space such that a center portion of the outer surface of the projection contacts an inner side of the space to remove the ink only from on the center portion of the outer surface of the spacer, thereby leaving the ink that was transferred to an edge portion of the outer surface of the projection in place.

4. The method of fabricating a cover glass of claim 1, wherein the printing layer is formed at an edge of the one surface of the base member that faces a third space surrounded by the first flat portion, the second flat portion, and the bending portion.

5. The method of fabricating a cover glass of claim 1, wherein:

the projection has a thickness smaller than that of the first main body, and the first space has a width greater than the thickness of the projection.

6. The method of fabricating a cover glass of claim 5, wherein when the projection is inserted into the first space, an outer surface of the projection is spaced from an inner side of the first space.

* * * * *